(12) United States Patent
Parikh et al.

(10) Patent No.: US 8,432,995 B2
(45) Date of Patent: Apr. 30, 2013

(54) ALGORITHMIC MATCHING OF A DESKEW CHANNEL

(75) Inventors: Samir Parikh, Sunnyvale, CA (US); Nikola Nedovic, San Jose, CA (US); William W. Walker, Los Gatos, CA (US)

(73) Assignee: Fujitsu Limited, Kawasaki-shi (JP)

( * ) Notice: Subject to any disclaimer, the term of this patent is extended or adjusted under 35 U.S.C. 154(b) by 469 days.

(21) Appl. No.: 12/840,985

(22) Filed: Jul. 21, 2010

(65) Prior Publication Data
US 2012/0023380 A1  Jan. 26, 2012

(51) Int. Cl.
*H04B 7/02* (2006.01)
*H04L 1/02* (2006.01)

(52) U.S. Cl.
USPC .............................. 375/267; 375/259; 714/700

(58) Field of Classification Search .................. 375/267, 375/259, 260; 714/700
See application file for complete search history.

(56) References Cited

U.S. PATENT DOCUMENTS

| | | | |
|---|---|---|---|
| 2007/0006053 A1* | 1/2007 | Otto et al. | 714/700 |
| 2009/0125652 A1* | 5/2009 | Huff | 710/71 |

OTHER PUBLICATIONS

"SerDes Framer Interface Level 5 Phase 2 (SFI-5.2): Implementation Agreement for 40Gb/s Interface for Physical Layer Devices", IA# OIF-SFI5-02.0, downloaded from http://www.oiforum.com/public/documents/OIF-SFI5-2%200_IA.pdf on Sep. 29, 2010, Oct. 2, 2006.
"IA Title: Serdes Framer Interface Level 5 Phase 2 (SFI-5.2): Implementation Agreement for 40Gb/s Interface for Physical Layer Devices," Optical Internetworking Forum, Oct. 2, 2006.
U.S. Appl. No. 12/511,917, filed Jul. 29, 2009.

* cited by examiner

*Primary Examiner* — David C. Payne
*Assistant Examiner* — Brian J Stevens
(74) *Attorney, Agent, or Firm* — Baker Botts L.L.P.

(57) ABSTRACT

In one embodiment, a method includes receiving input data bits over data channels; receiving deskew channel bits constituting frames that each comprise ones of the input data bits; determining frame boundaries; mapping each of the input data bits in each of the frames to one of the data channels; for each set of the frames, comparing the input data bits in the set with the input data bits in the corresponding input data words; determining relative delays among the data channels and the deskew channel; when non-zero delays are determined, rearranging the input data bits to reduce the delays; and when it is determined that one or more of the data channels have a delay of greater than a predetermined number of data-channel clock periods relative to a particular data channel, delaying input data bits in the particular data channel by an additional number of input data bits.

27 Claims, 27 Drawing Sheets

| CH3 | E | CH0 | CH1 | CH2 |
|---|---|---|---|---|
| CH2 | CH3 | O | CH0 | CH1 |
| CH1 | CH2 | CH3 | E | CH0 |
| CH0 | CH1 | CH2 | CH3 | O |

*FIG. 6A*

| CH3 | O | CH0 | CH1 | CH2 |
|---|---|---|---|---|
| CH2 | CH3 | E | CH0 | CH1 |
| CH1 | CH2 | CH3 | O | CH0 |
| CH0 | CH1 | CH2 | CH3 | E |

*FIG. 6B*

| BIT | DSCLT0 | DSCLT1 | DSCLT2 | DSCLT3 | DSCLT4 |
|---|---|---|---|---|---|
| 3 | CH2 | CH1 | CH0 | E | CH3 |
| 2 | CH1 | CH0 | O | CH3 | CH2 |
| 1 | CH0 | E | CH3 | CH2 | CH1 |
| 0 | O | CH3 | CH2 | CH1 | CH0 |

*FIG. 9A*

| BIT | DSCLT0 | DSCLT1 | DSCLT2 | DSCLT3 | DSCLT4 |
|---|---|---|---|---|---|
| 3 | CH2 | CH1 | CH0 | O | CH3 |
| 2 | CH1 | CH0 | E | CH3 | CH2 |
| 1 | CH0 | O | CH3 | CH2 | CH1 |
| 0 | E | CH3 | CH2 | CH1 | CH0 |

*FIG. 9B*

| DIFFERENCE IN UI | DSCLT6[3] | DSCLT5[2] | DSCLT4[1] | DSCLT3[0] | OUTPUT |
|---|---|---|---|---|---|
| +7 | DAT3LT8[2] | DAT3LT7[1] | DAT3LT6[0] | DAT3LT4[3] | C3MCH0[14] |
| +6 | DAT3LT8[1] | DAT3LT7[0] | DAT3LT5[3] | DAT3LT4[2] | C3MCH0[13] |
| +5 | DAT3LT8[0] | DAT3LT6[3] | DAT3LT5[2] | DAT3LT4[1] | C3MCH0[12] |
| +4 | DAT3LT7[3] | DAT3LT6[2] | DAT3LT5[1] | DAT3LT4[0] | C3MCH0[11] |
| +3 | DAT3LT7[2] | DAT3LT6[1] | DAT3LT5[0] | DAT3LT3[3] | C3MCH0[10] |
| +2 | DAT3LT7[1] | DAT3LT6[0] | DAT3LT4[3] | DAT3LT3[2] | C3MCH0[9] |
| +1 | DAT3LT7[0] | DAT3LT5[3] | DAT3LT4[2] | DAT3LT3[1] | C3MCH0[8] |
| 0 | DAT3LT6[3] | DAT3LT5[2] | DAT3LT4[1] | DAT3LT3[0] | C3MCH0[7] |
| -1 | DAT3LT6[2] | DAT3LT5[1] | DAT3LT4[0] | DAT3LT2[3] | C3MCH0[6] |
| -2 | DAT3LT6[1] | DAT3LT5[0] | DAT3LT3[3] | DAT3LT2[2] | C3MCH0[5] |
| -3 | DAT3LT6[0] | DAT3LT4[3] | DAT3LT3[2] | DAT3LT2[1] | C3MCH0[4] |
| -4 | DAT3LT5[3] | DAT3LT4[2] | DAT3LT3[1] | DAT3LT2[0] | C3MCH0[3] |
| -5 | DAT3LT5[2] | DAT3LT4[1] | DAT3LT3[0] | DAT3LT1[3] | C3MCH0[2] |
| -6 | DAT3LT5[1] | DAT3LT4[0] | DAT3LT2[3] | DAT3LT1[2] | C3MCH0[1] |
| -7 | DAT3LT5[0] | DAT3LT3[3] | DAT3LT2[2] | DAT3LT1[1] | C3MCH0[0] |

*FIG. 13A*

| DIFFERENCE IN UI | DSCLT6[2] | DSCLT5[1] | DSCLT4[0] | DSCLT2[3] | OUTPUT |
|---|---|---|---|---|---|
| +7 | DAT2LT8[1] | DAT2LT7[0] | DAT2LT5[3] | DAT2LT4[2] | C2MCH0[14] |
| +6 | DAT2LT8[0] | DAT2LT6[3] | DAT2LT5[2] | DAT2LT4[1] | C2MCH0[13] |
| +5 | DAT2LT7[3] | DAT2LT6[2] | DAT2LT5[1] | DAT2LT4[0] | C2MCH0[12] |
| +4 | DAT2LT7[2] | DAT2LT6[1] | DAT2LT5[0] | DAT2LT3[3] | C2MCH0[11] |
| +3 | DAT2LT7[1] | DAT2LT6[0] | DAT2LT4[3] | DAT2LT3[2] | C2MCH0[10] |
| +2 | DAT2LT7[0] | DAT2LT5[3] | DAT2LT4[2] | DAT2LT3[1] | C2MCH0[9] |
| +1 | DAT2LT6[3] | DAT2LT5[2] | DAT2LT4[1] | DAT2LT3[0] | C2MCH0[8] |
| 0 | DAT2LT6[2] | DAT2LT5[1] | DAT2LT4[0] | DAT2LT2[3] | C2MCH0[7] |
| -1 | DAT2LT6[1] | DAT2LT5[0] | DAT2LT3[3] | DAT2LT2[2] | C2MCH0[6] |
| -2 | DAT2LT6[0] | DAT2LT4[3] | DAT2LT3[2] | DAT2LT2[1] | C2MCH0[5] |
| -3 | DAT2LT5[3] | DAT2LT4[2] | DAT2LT3[1] | DAT2LT2[0] | C2MCH0[4] |
| -4 | DAT2LT5[2] | DAT2LT4[1] | DAT2LT3[0] | DAT2LT1[3] | C2MCH0[3] |
| -5 | DAT2LT5[1] | DAT2LT4[0] | DAT2LT2[3] | DAT2LT1[2] | C2MCH0[2] |
| -6 | DAT2LT5[0] | DAT2LT3[3] | DAT2LT2[2] | DAT2LT1[1] | C2MCH0[1] |
| -7 | DAT2LT4[3] | DAT2LT3[2] | DAT2LT2[1] | DAT2LT1[0] | C2MCH0[0] |

*FIG. 13B*

| DIFFERENCE IN UI | DSCLT6[1] | DSCLT5[0] | DSCLT3[3] | DSCLT2[2] | OUTPUT |
|---|---|---|---|---|---|
| +7 | DAT1LT8[0] | DAT1LT6[3] | DAT1LT5[2] | DAT1LT4[1] | C1MCH0[14] |
| +6 | DAT1LT7[3] | DAT1LT6[2] | DAT1LT5[1] | DAT1LT4[0] | C1MCH0[13] |
| +5 | DAT1LT7[2] | DAT1LT6[1] | DAT1LT5[0] | DAT1LT3[3] | C1MCH0[12] |
| +4 | DAT1LT7[1] | DAT1LT6[0] | DAT1LT4[3] | DAT1LT3[2] | C1MCH0[11] |
| +3 | DAT1LT7[0] | DAT1LT5[3] | DAT1LT4[2] | DAT1LT3[1] | C1MCH0[10] |
| +2 | DAT1LT6[3] | DAT1LT5[2] | DAT1LT4[1] | DAT1LT3[0] | C1MCH0[9] |
| +1 | DAT1LT6[2] | DAT1LT5[1] | DAT1LT4[0] | DAT1LT2[3] | C1MCH0[8] |
| 0 | DAT1LT6[1] | DAT1LT5[0] | DAT1LT3[3] | DAT1LT2[2] | C1MCH0[7] |
| -1 | DAT1LT6[0] | DAT1LT4[3] | DAT1LT3[2] | DAT1LT2[1] | C1MCH0[6] |
| -2 | DAT1LT5[3] | DAT1LT4[2] | DAT1LT3[1] | DAT1LT2[0] | C1MCH0[5] |
| -3 | DAT1LT5[2] | DAT1LT4[1] | DAT1LT3[0] | DAT1LT1[3] | C1MCH0[4] |
| -4 | DAT1LT5[1] | DAT1LT4[0] | DAT1LT2[3] | DAT1LT1[2] | C1MCH0[3] |
| -5 | DAT1LT5[0] | DAT1LT3[3] | DAT1LT2[2] | DAT1LT1[1] | C1MCH0[2] |
| -6 | DAT1LT4[3] | DAT1LT3[2] | DAT1LT2[1] | DAT1LT1[0] | C1MCH0[1] |
| -7 | DAT1LT4[2] | DAT1LT3[1] | DAT1LT2[0] | DAT1LT0[3] | C1MCH0[0] |

*FIG. 13C*

| DIFFERENCE IN UI | DSCLT6[0] | DSCLT4[3] | DSCLT3[2] | DSCLT2[1] | OUTPUT |
|---|---|---|---|---|---|
| +7 | DAT0LT7[3] | DAT0LT6[2] | DAT0LT5[1] | DAT0LT4[0] | C0MCH0[14] |
| +6 | DAT0LT7[2] | DAT0LT6[1] | DAT0LT5[0] | DAT0LT3[3] | C0MCH0[13] |
| +5 | DAT0LT7[1] | DAT0LT6[0] | DAT0LT4[3] | DAT0LT3[2] | C0MCH0[12] |
| +4 | DAT0LT7[0] | DAT0LT5[3] | DAT0LT4[2] | DAT0LT3[1] | C0MCH0[11] |
| +3 | DAT0LT6[3] | DAT0LT5[2] | DAT0LT4[1] | DAT0LT3[0] | C0MCH0[10] |
| +2 | DAT0LT6[2] | DAT0LT5[1] | DAT0LT4[0] | DAT0LT2[3] | C0MCH0[9] |
| +1 | DAT0LT6[1] | DAT0LT5[0] | DAT0LT3[3] | DAT0LT2[2] | C0MCH0[8] |
| 0 | DAT0LT6[0] | DAT0LT4[3] | DAT0LT3[2] | DAT0LT2[1] | C0MCH0[7] |
| -1 | DAT0LT5[3] | DAT0LT4[2] | DAT0LT3[1] | DAT0LT2[0] | C0MCH0[6] |
| -2 | DAT0LT5[2] | DAT0LT4[1] | DAT0LT3[0] | DAT0LT1[3] | C0MCH0[5] |
| -3 | DAT0LT5[1] | DAT0LT4[0] | DAT0LT2[3] | DAT0LT1[2] | C0MCH0[4] |
| -4 | DAT0LT5[0] | DAT0LT3[3] | DAT0LT2[2] | DAT0LT1[1] | C0MCH0[3] |
| -5 | DAT0LT4[3] | DAT0LT3[2] | DAT0LT2[1] | DAT0LT1[0] | C0MCH0[2] |
| -6 | DAT0LT4[2] | DAT0LT3[1] | DAT0LT2[0] | DAT0LT0[3] | C0MCH0[1] |
| -7 | DAT0LT4[1] | DAT0LT3[0] | DAT0LT1[3] | DAT0LT0[2] | C0MCH0[0] |

ALGORITHMIC MATCHING OF A DESKEW CHANNEL

TECHNICAL FIELD

This disclosure relates generally to signal communication.

BACKGROUND

A typical line interface of a communication system with optical links generally includes three devices: an optical module that includes a serializer/deserializer (SerDes) component, a forward error correction (FEC) processor, and a framer. The interconnection between these devices is electrical and the maximum data rate per signal is typically less than the optical data rate. Thus, a multi-bit bus is generally required. Due to the physical implementation of the multi-bit bus data channels, different delays can be experienced between the SerDes component and the FEC processor or framer resulting in incorrect bit matching when reconstructing the original data stream received from the optical link. Generally, the different delays between the data channels can span several unit intervals (UIs) and are static. To facilitate proper reconstruction, selected data bits communicated along the data channels are accompanied by a synchronizer bit in a separate deskew channel.

BRIEF DESCRIPTION OF THE DRAWINGS

FIGS. 6A and 6B illustrate example frame matching patterns.

FIGS. 9A and 9B illustrate example frame matching patterns including signal and timing information.

FIGS. 13A, 13B, 13C, and 13D each illustrate bit comparisons that may be made to align data channels relative to a deskew channel.

DESCRIPTION OF EXAMPLE EMBODIMENTS

Particular embodiments relate to a deskew logic circuit suitable for use in a 40 Gigabits per second (Gb/s) serializer. In particular embodiments, the serializer receives as input four four-bit differential data signals at 10 Giga-Hertz (GHz) and a four-bit deskew signal at 10 GHz, removes skew and/or wander in the data signals using the deskew signal, and outputs one or more output signals at a total output data rate of 40 Gb/s. In particular embodiments, the serializer is a SFI-5.2 compliant digital CMOS serializer having reduced power consumption compared to, by way of example, conventional SiGe integrated circuits (ICs). In particular embodiments, the output of the serializer is transmitted to a DQPSK (Differential Quadrature PhaseShift Keying) modulator. Additionally, in the described embodiments, all signals or streams described below are differential, where appropriate. Generally, any signal name followed by an "x" denotes the (differential) complement of another signal having the same name, where appropriate.

Figure 1:
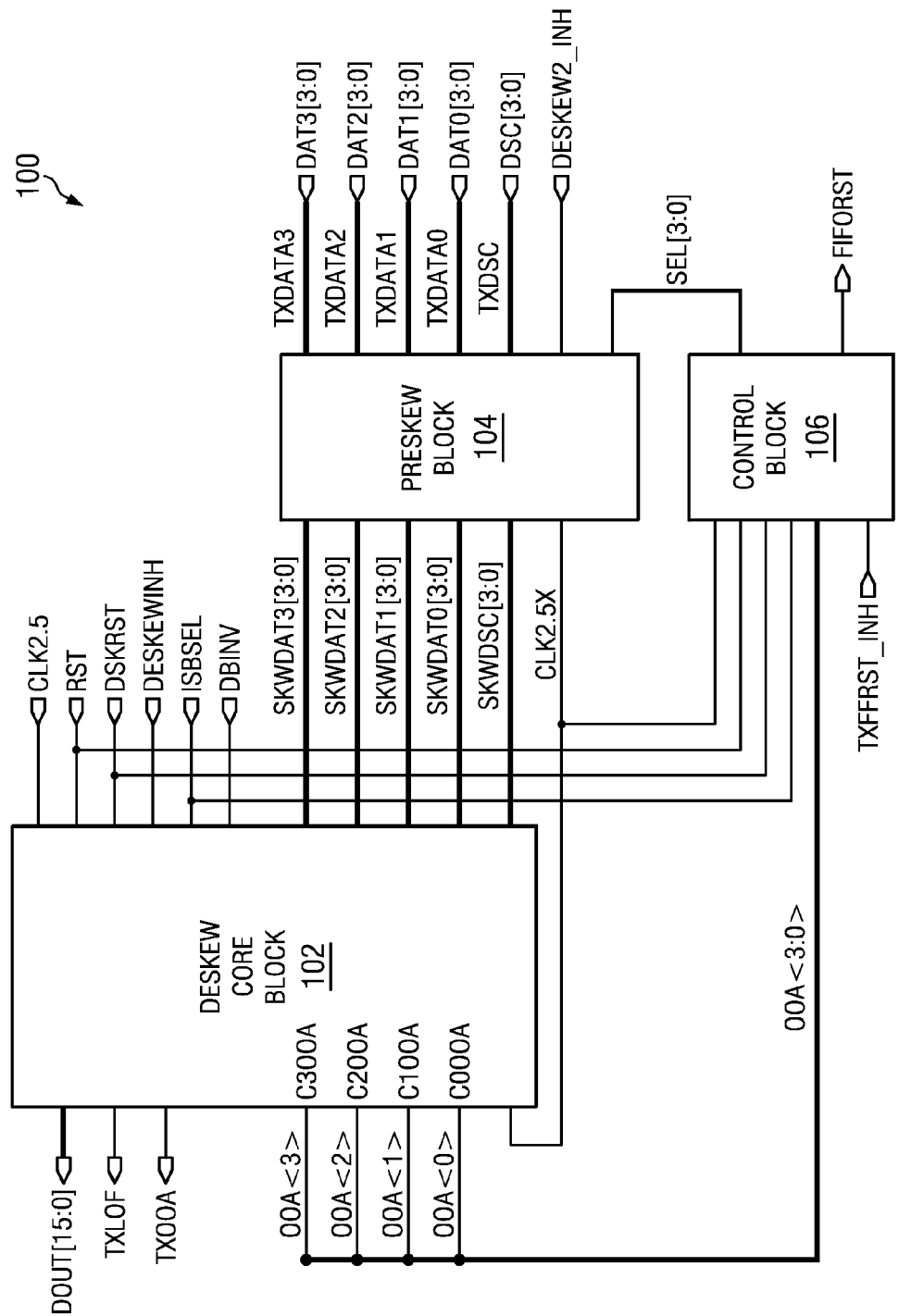
FIG. 1 illustrates an example deskew logic circuit.

FIG. 1 illustrates an example embodiment of a deskew logic circuit 100 that includes a deskew core block 102, a preskew block 104, and a control block 106. As described above, in particular embodiments, deskew logic circuit 100 is configured for use in a serializer. In particular embodiments, preskew block 104 receives as input four data channels TXDATA3, TXDATA2, TXDATA1, and TXDATA0 (collectively referred to as TXDATA[3:0]) communicating differential data signals DAT3[3:0], DAT2[3:0], DAT1[3:0], and DAT0[3:0], respectively. In one example embodiment, each of differential data signals DAT3[3:0], DAT2[3:0], DAT1[3:0], and DAT0[3:0] is a four-bit differential data signal received at a data channel clock frequency of approximately 10 GHz (with bit 3 being the earliest in time in the example notation). That is, in this embodiment, each of the data channels TXDATA3, TXDATA2, TXDATA1, and TXDATA0 is itself a multi-bit bus where each wire or trace of the multi-bit bus communicates selected bits (at a clock $clk_{2.5}$ having a frequency of 2.5 GHz) of one of the respective four-bit data signals DAT3[3:0], DAT2[3:0], DAT1[3:0], and DAT0[3:0] (As each four-bit differential data signal is a differential data signal, each data channel may include eight traces, one for each of the four component data signals making up the four-bit data signal as well as traces for the four respective complement data signals).

In particular embodiments, preskew block 104 further receives as input a deskew channel TXDSC that communicates a four-bit deskew signal DSC[3:0] at 10 Gb/s. Again, in one example embodiment, the deskew channel TXDSC is itself a multi-bit bus where each wire or trace of the multi-bit bus communicates selected bits from the deskew signal DSC [3:0] at 2.5 GHz.

Figure 2:
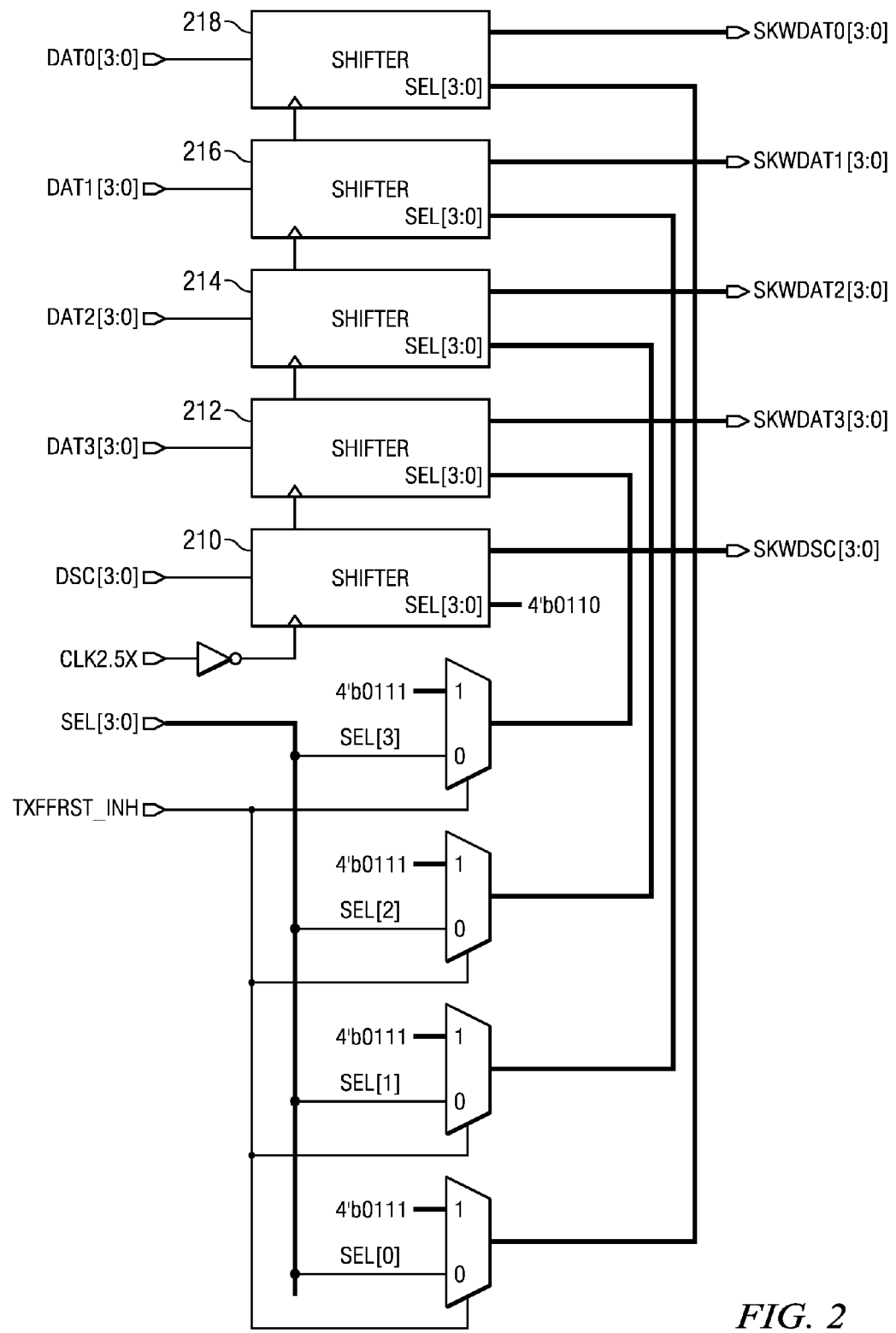
FIG. 2 illustrates an example preskew block suitable for use in the deskew logic circuit of FIG. 1.
Figure 3:
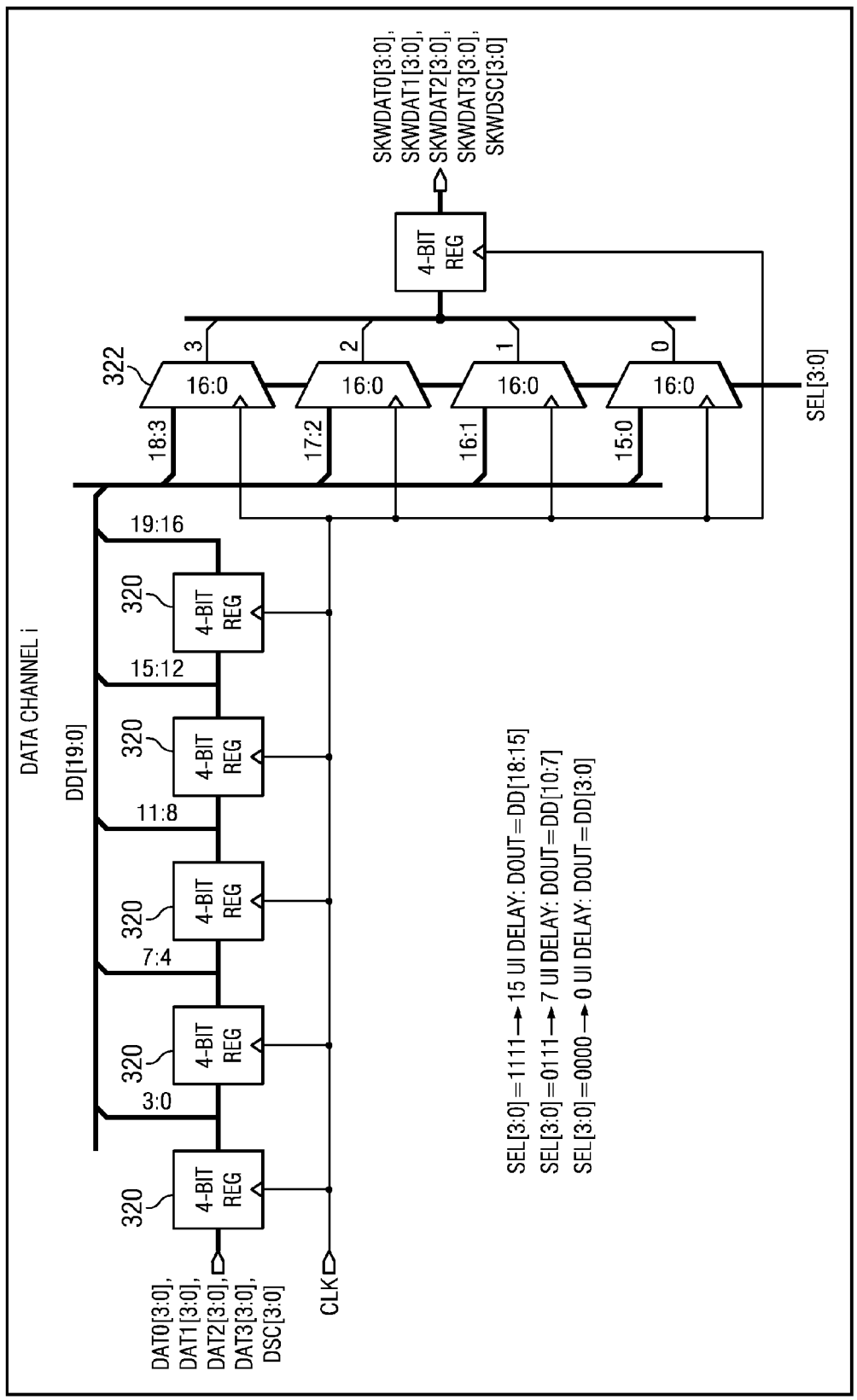
FIG. 3 illustrates example logic suitable for use in the preskew block of FIG. 2.

FIG. 2 illustrates an example preskew block 104. In the illustrated embodiment, preskew block 104 includes five shifter stages 210, 212, 214, 216, and 218, respectively, which, in the illustrated embodiment, are identical. Preskew block 104 also includes control logic for controlling the shifter stages. In the illustrated embodiment, shifter stages 210, 212, 214, 216, and 218 receive signals DSC[3:0], DAT3 [3:0], DAT2[3:0], DAT1[3:0], and DAT0[3:0], respectively. In one example embodiment, each of the five shifter stages 210, 212, 214, 216, and 218 includes five consecutive four-bit registers 320 and four 16:1 multiplexers 322 as illustrated in FIG. 3. Depending on the value of the respective bits from control input sel[3:0] to the shifter stages 210, 212, 214, 216, and 218, the incoming four-bit (2.5 Gb/s) data received at the shifter stage from the respective one of the four-bit data signals DSC[3:0], DAT3[3:0], DAT2[3:0], DAT1[3:0], and DAT0[3:0] is delayed by sel cycles in the 10 Gb/s data domain. In an example embodiment, the delay range is from 0 to 15 UIs (in the 10 Gb/s cycle domain), but, as will be described later, in an example embodiment, only values of 0 (no delay), 7, and 15 UI are used for the shifters 212, 214, 216, and 218 corresponding to the data signals DAT3[3:0], DAT2 [3:0], DAT1[3:0], and DAT0[3:0], respectively, while a value of 6 UI is used for shifter 210 and the corresponding deskew signal DSC[3:0]. By way of example, when the bit values of the sel[3:0] signal are 1111, the delay is 15 UI, when the bit values of the sel[3:0] signal are 0111, the delay is 7 UI, and when the bit values of the sel[3:0] signal are 0000, the delay is 0 UI.

Preskew block 104 outputs differential data signals SKW-DAT3[3:0], SKWDAT2[3:0], SKWDAT1[3:0], SKWDAT0 [3:0], and SKWDSC[3:0], which are simply the (potentially) delayed versions of the data signals DAT3[3:0], DAT2[3:0], DAT1[3:0], and DAT0[3:0], and deskew signal DSC[3:0], respectively. That is, the data signals SKWDAT3[3:0], SKWDAT2[3:0], SKWDAT1[3:0], and SKWDAT0[3:0] are delayed by 0 (no delay), 7, or 15 UI relative to the data signals DAT3[3:0], DAT2[3:0], DAT1[3:0], and DAT0[3:0], respectively, while the deskew signal SKWDSC[3:0] is delayed by 0 or 6 UI relative to the deskew signal DSC[3:0].

Figure 4:
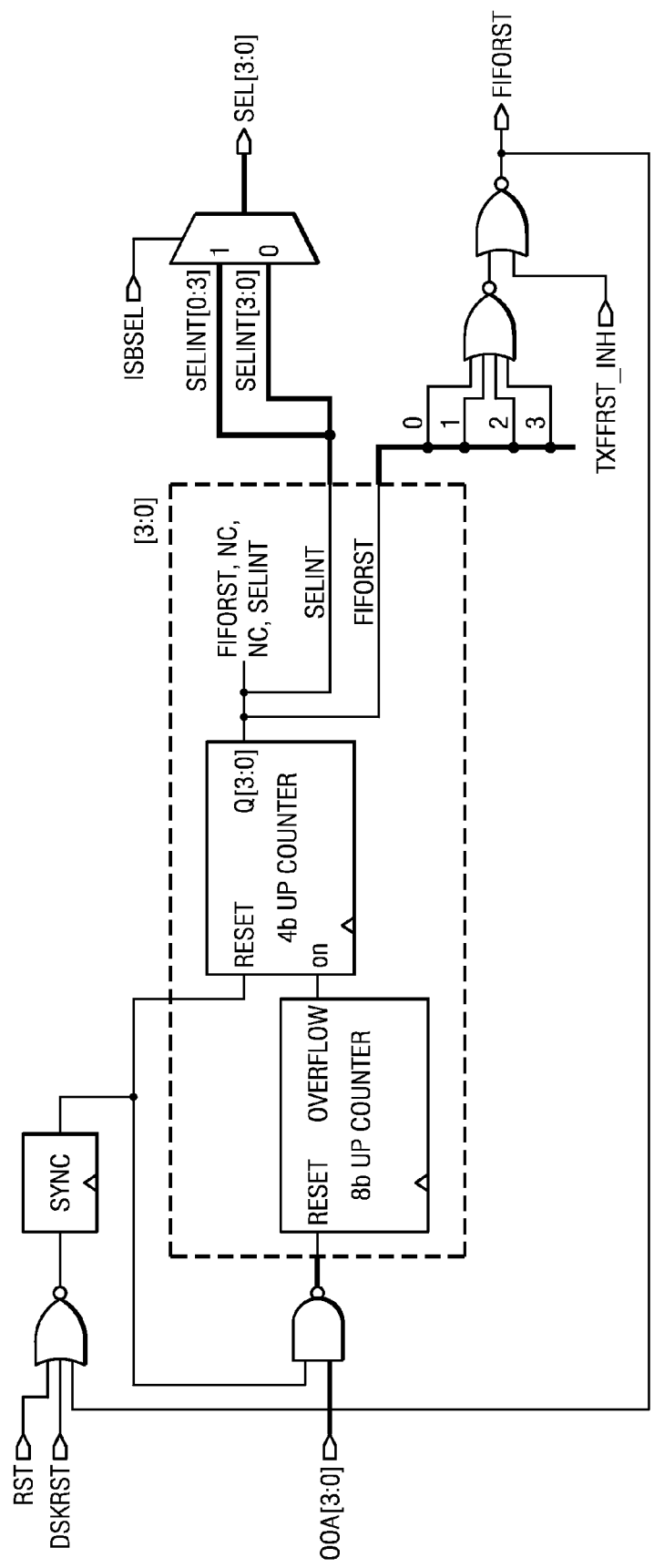
FIG. 4 illustrates an example control block suitable for use in the deskew logic circuit of FIG. 1.

FIG. 4 illustrates an example control block 106. In particular embodiments, control block 106 performs two operations for each clock cycle. The first operation control block 106 performed involves counting the number of consecutive (2.5 GHz) clock cycles (if any) that each of the data signals SKW-DAT3[3:0], SKWDAT2[3:0], SKWDAT1[3:0], and SKW-DAT0[3:0] has been out of alignment. In one example embodiment, if any of the four data signals SKWDAT3[3:0], SKWDAT2[3:0], SKWDAT1[3:0], and SKWDAT0[3:0] has been out of alignment for 256 consecutive clock cycles, it is possible that the searching/matching performed by deskew core block 102 is happening in the wrong range. In particular embodiments, when control block 106 detects that a data signal has been out of alignment for 256 consecutive clock cycles, control block 106 flips that value of the bit in sel[3:0] for the corresponding data channel, which changes the search range for the deskew core block 102 for that particular data channel and data signal. Thus, the first operation performed by control block 106 functions to ensure that the right search range is set for deskew core block 102 for each of the data signals SKWDAT3[3:0], SKWDAT2[3:0], SKWDAT1[3:0], and SKWDAT0[3:0].

In particular embodiments, the second operation control block 106 performs involves counting the number of times that the search range has been consecutively switched (if any) for each of the data signals SKWDAT3[3:0], SKWDAT2[3: 0], SKWDAT1[3:0], and SKWDAT0[3:0]. In one example embodiment, if the search range for a particular data channel/signal has been switched 16 consecutive times, the fiforst signal is asserted, which results in the reset of the data buffer in an attempt to correct erroneous operation.

Deskew core block 102 includes logic for removing skew between the data signals SKWDAT3[3:0], SKWDAT2[3:0], SKWDAT1[3:0], and SKWDAT0[3:0] using information coded within the deskew signal DSC[3:0]. In an example embodiment, deskew block 102 is configured to remove up to ±7 UIs of skew between the data signals SKWDAT3[3:0], SKWDAT2[3:0], SKWDAT1[3:0], and SKWDAT0[3:0], and hence, up to ±15 UIs of skew between the data signals DAT3 [3:0], DAT2[3:0], DAT1[3:0], and DAT0[3:0] as each of the data signals DAT3[3:0], DAT2[3:0], DAT1[3:0], and DAT0 [3:0] may be delayed with respect to one another by up to 15 UI by preskew block 104. In one example embodiment, deskew core block 102 takes into account that the bits from each of the data channels and respective data signals DAT3 [3:0], DAT2[3:0], DAT1[3:0], and DAT0[3:0] are received in groups of four per clock cycle (at a clock $clk_{2.5}$ having a frequency of 2.5 GHz).

In particular embodiments, deskew core block 102 operates according to three phases. In phase 1, deskew core block 102 identifies the frame boundaries in the deskew signal SKWDSC[3:0]. In phase 2, deskew core block 102 determines the time difference in UI (if any) between the deskew signal SKWDSC[3:0] and each of the data signals SKW-DAT3[3:0], SKWDAT2[3:0], SKWDAT1[3:0], and SKW-DAT0[3:0] by matching bits in the deskew signal SKWDSC [3:0] to bits in each of the data signals SKWDAT3[3:0], SKWDAT2[3:0], SKWDAT1[3:0], and SKWDAT0[3:0]. In phase 3, deskew core block 102 multiplexes the data bits from the data signals SKWDAT3[3:0], SKWDAT2[3:0], SKW-DAT1[3:0], and SKWDAT0[3:0] to the output, which in the illustrated embodiment is a 16-bit differential output signal DOUT[15:0] at 2.5 GHz, based on the time differences between the deskew signal SKWDSC[3:0] and each of the data signals SKWDAT3[3:0], SKWDAT2[3:0], SKWDAT1 [3:0], and SKWDAT0[3:0]. In one example embodiment, if the signal ISBSEL is enabled/asserted, the data signals may be reversed/swapped (DAT3[3:0] with DAT0[3:0] and DAT2 [3:0] with DAT1[3:0]). In one example embodiment, if the signal DBINV is enabled/asserted, the bits in odd nibbles (described below) are inverted. If deskewEN is disabled, the deskew operation does not happen and the bits in the data signals DAT3[3:0], DAT2[3:0], DAT1[3:0], and DAT0[3:0] are forwarded straight to the output.

Figure 5:
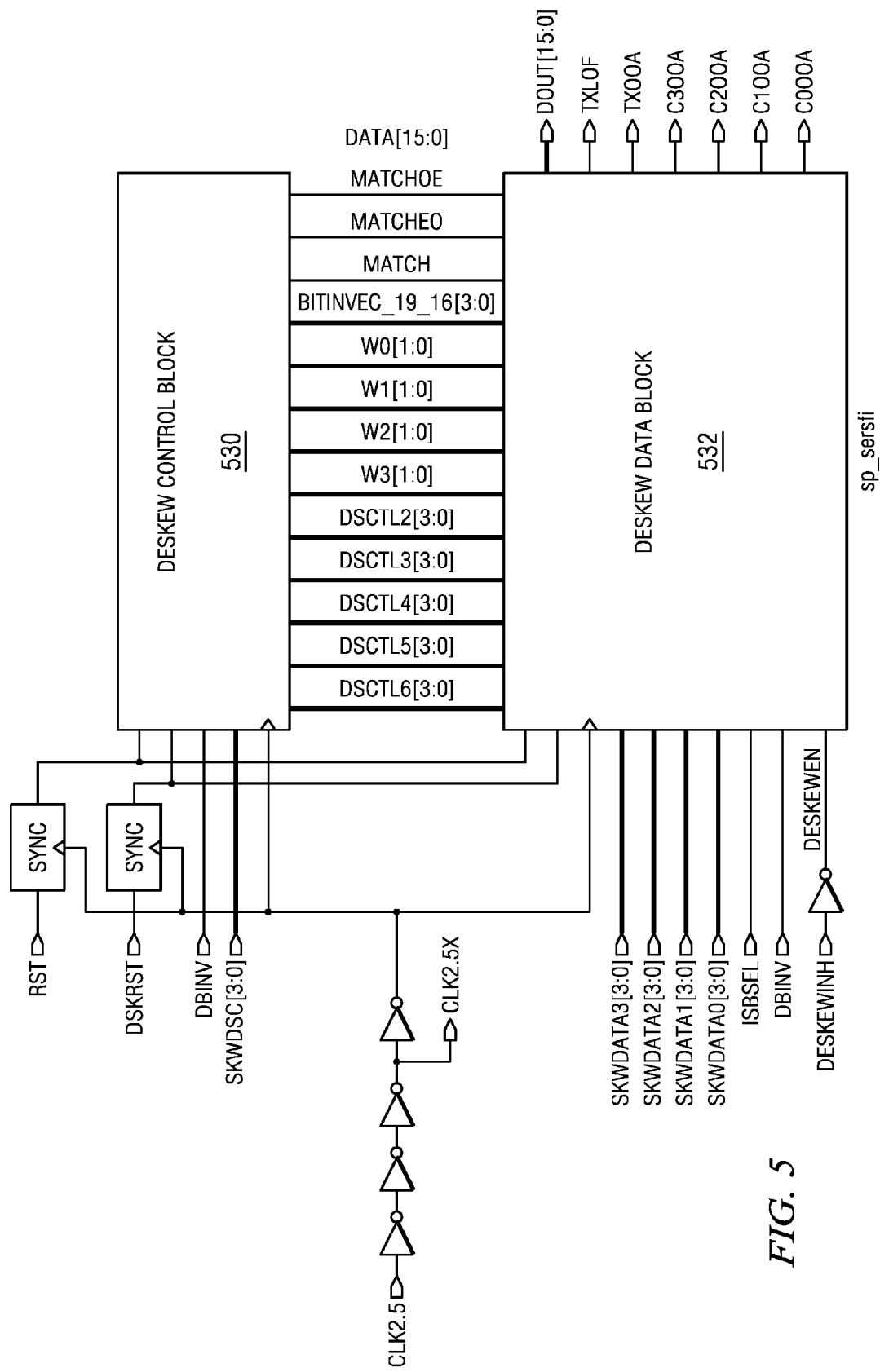
FIG. 5 illustrates an example deskew core block suitable for use in the deskew logic circuit of FIG. 1.

FIG. 5 illustrates an example deskew core block 102 that includes deskew control block 530 and deskew data block 532. In the illustrated embodiment, deskew data block 532 receives as input the data signals SKWDAT3[3:0], SKW-DAT2[3:0], SKWDAT1[3:0], and SKWDAT0[3:0] as well as control signal inputs deskewEN, ISBSEL, and DBINV, and outputs 16-bit output signal DOUT[15:0] at 2.5 GHz. Deskew control block 530 receives as input SKWDSC[3:0] and control signal DBINV. Deskew data block 532 and deskew control block 530 are configured to communicate with each other via a number of channels and corresponding signals, as illustrated in FIG. 5.

During the frame matching operation (of course it should be appreciated that this and any of the operations, methods, or processes described herein may be performed on an ongoing or concurrent basis with any other operation, method, or process, where appropriate), in phase 1, deskew control block 530 analyzes bits in deskew signal SKWDSC[3:0]. Since the bits in SKWDSC[3:0] are input at a rate of four per 2.5 GHz clock cycle, and since one frame spans 10 bits (as described below with reference to FIGS. 21A and 21B), it is advantageous in particular embodiments to match two frames (i.e., 20 bits) at the same time with 20 being the minimum common multiple between 4 and 10. As illustrated in FIGS. 6A and 6B, there are two possible frame patterns that repeat every five data words or cycles based on the link delay: one with even nibbles followed by odd nibbles ("EO" pattern; FIG. 6A), and one with odd nibbles followed by even nibbles ("OE" pattern; FIG. 6B). In FIGS. 6A and 6B, "E" denotes an even parity bit, "O" denotes an odd parity bit, "CH3" denotes a bit from SKWDAT3[3:0], "CH2" denotes a bit from SKWDAT2[3:0], "CH1" denotes a bit from SDWDAT1[3:0], and "CH0" denotes a bit from SKWDAT0[3:0]. As the skew between SKWDSC[3:0] and data signals SKWDAT3[3:0], SKWDAT2[3:0], SKWDAT1[3:0], and SKWDAT0[3:0] is not known, phase 1 involves determining frame boundaries using the patterns in FIGS. 6A and 6B. More particularly, deskew control block 530 uses identified parity bits to determine where the boundaries of the received frames are.

Figure 7:
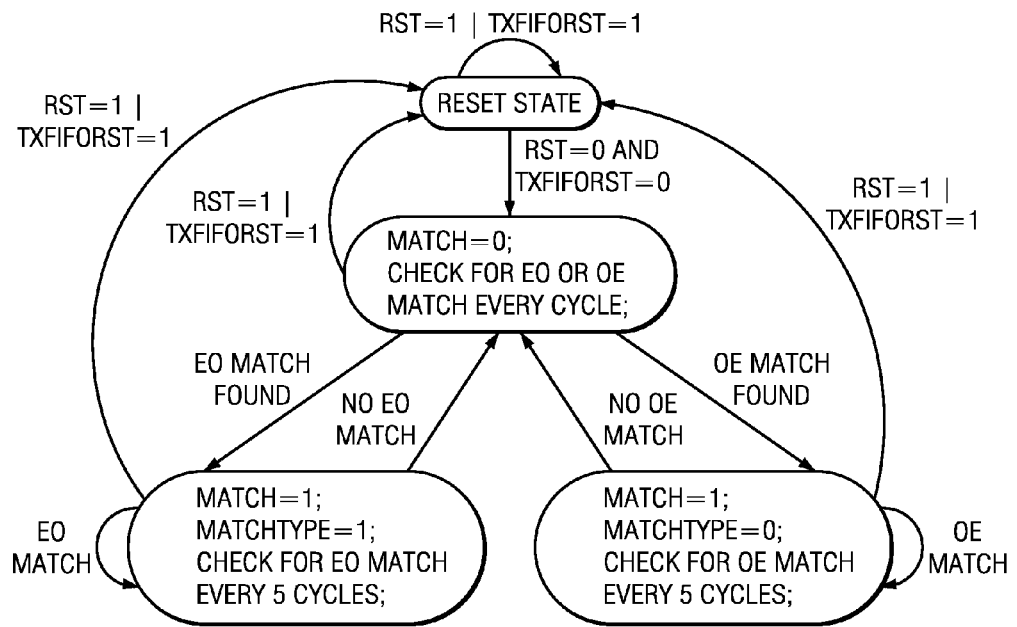
FIG. 7 shows a flow chart of a state machine that may be used to detect frames.
Figure 8:
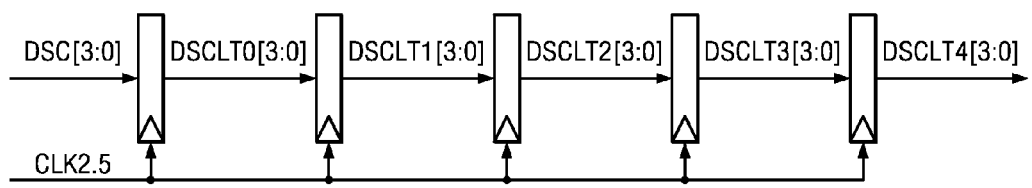
FIG. 8 illustrates an example data FIFO.

FIG. 7 shows a flow chart of a state machine (e.g., incorporated into the logic of deskew core block 102) used to detect frames. If either RST or TXFIFORST is enabled (i.e., RST=1 or TXFIFORST=1), the state machine is in a reset state. When both RST and TXFIFORST are disabled (i.e., RST=0 and TXFIFORST=0), frame matches are attempted every clock cycle. When a match is found, MATCH is set to 1 and MATCHTYPE is set to 1 if an EO pattern was detected or 0 if an OE pattern was detected. Subsequently, matches are attempted every five cycles (either EO or OE depending on the state) to ensure that there is no loss of frame. If a match fails, then MATCH is set to 0 and EO and OE matches are again attempted every cycle. Note that in particular embodiments, two frames are attempted to be matched at the same time (making it more unlikely to have a false match). However, even if a false match happens, the state machine would reverse to the previous state when a new match is attempted five cycles later. Again, as shown in the flow chart, frame matching takes five cycles. As a result, a five-cycle pipeline (or five-slot deep FIFO), an example of which FIG. 8 illustrates, may be required for the deskew channel data in deskew signal DSC[3:0] in order to perform the frame matching operation. As described later, in one example embodiment, the deskew channel data is also required for two more cycles.

FIGS. 9A and 9B are similar to FIGS. 6A and 6B, respectively, but also show timing information as well as signal information when matches should happen. Each column in FIGS. 9A and 9B represent the output of a register of the logic illustrated in FIG. 8 while each row represent a bit location in these registers.

Figures 10A, 10B:
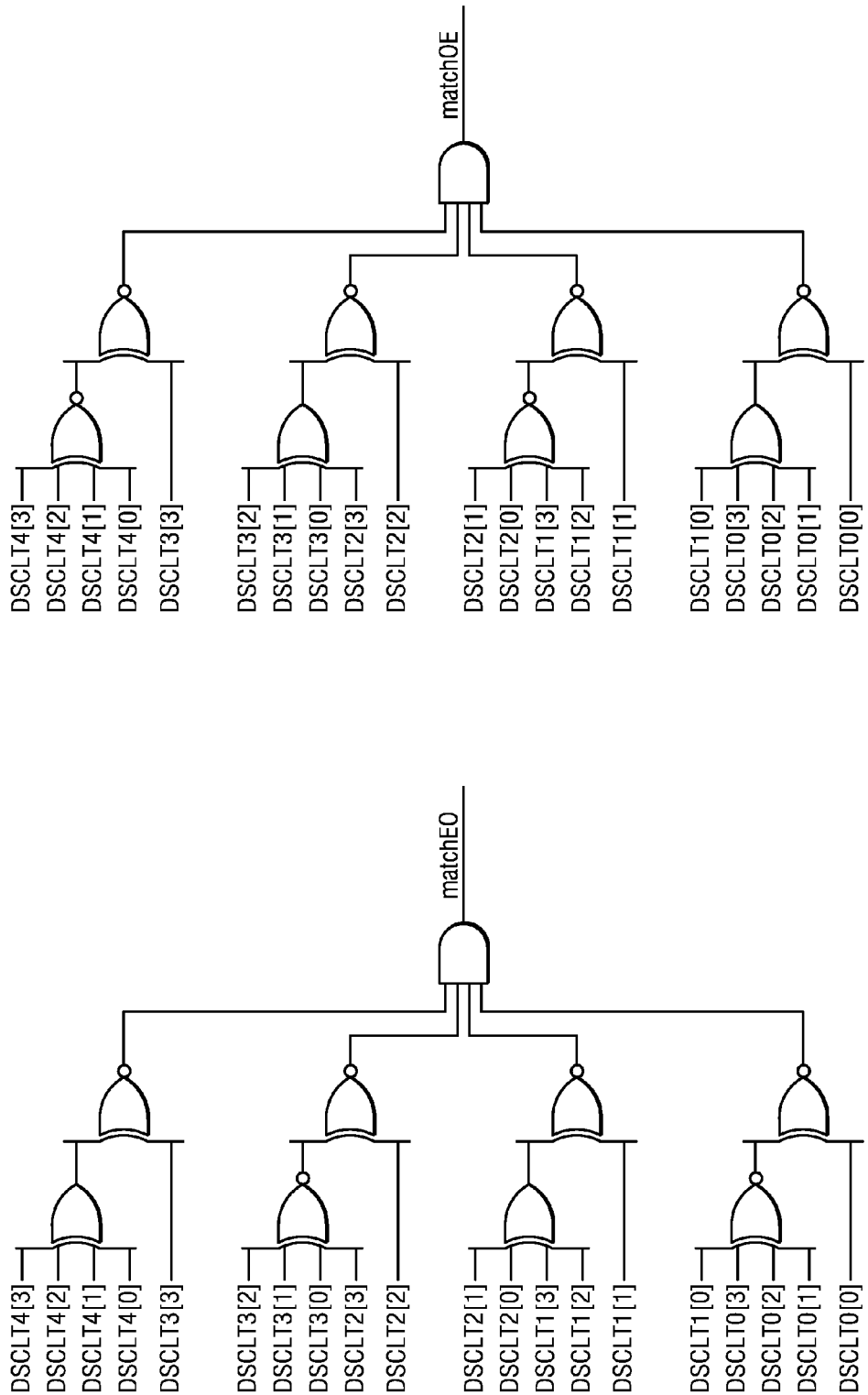
FIGS. 10A and 10B illustrate example logic within a deskew block for matching frame patterns.

FIG. 10A illustrates an example circuit or logic within deskew core block 102 that may be used to match EO frame patterns while FIG. 10B illustrates an example circuit or logic within deskew core block 102 that may be used to match OE frame patterns. When a match has been found, the output of the match circuits may be checked every five cycles. By way of example, a five-bit shift register, W[4:0], may be used to perform this task. When a match is found for the first time, W[4:0] may be set to 10000. Register W[4:0] may then rotate right every cycle. Assuming that it takes one cycle to set W[4:0] after the match has been found, the output of the frame match circuits of FIGS. 10A and 10B should be checked when W[0]=1.

Figure 11:
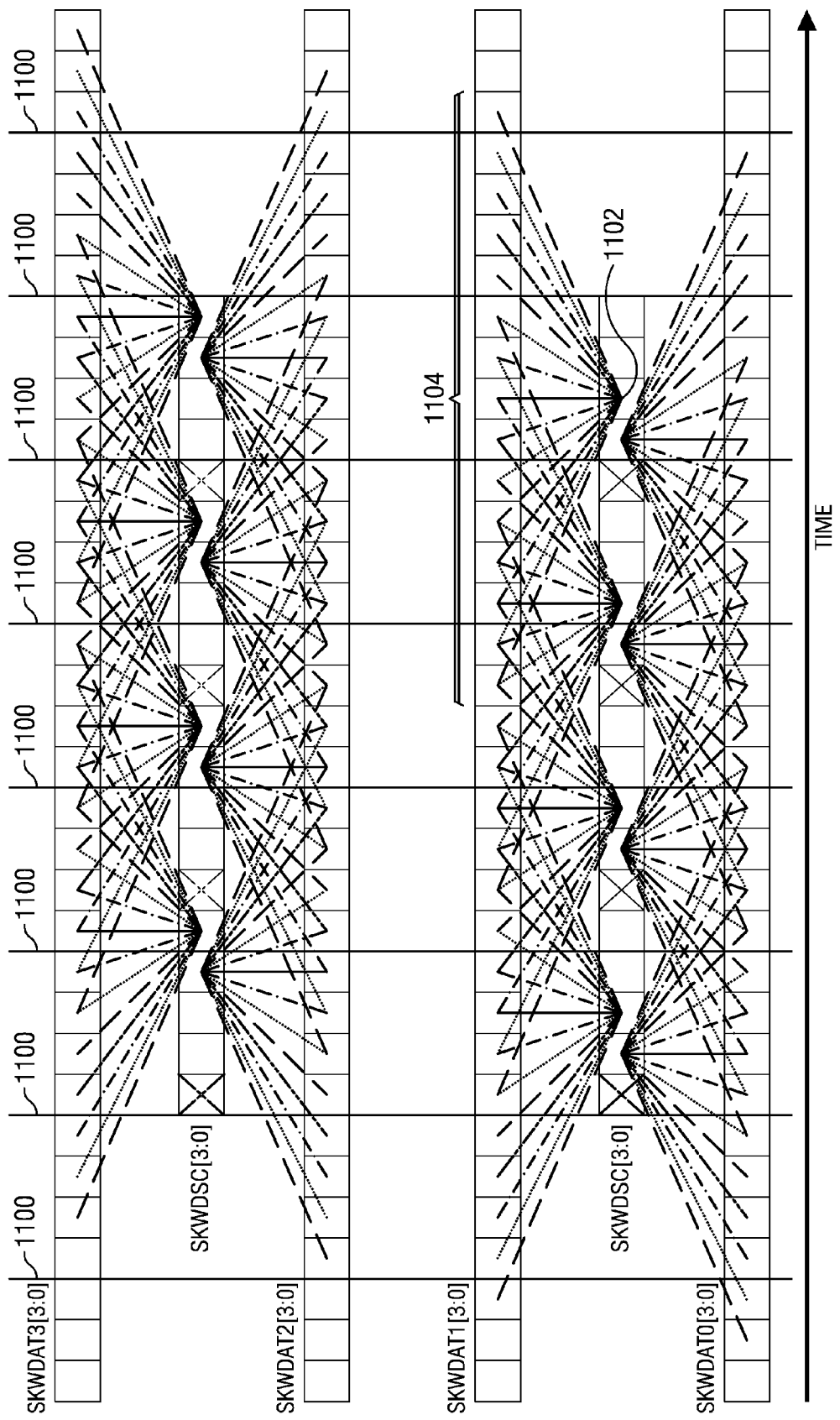
FIG. 11 illustrates the bit comparisons that may be made for determining skew.

In particular embodiments, deskew core block 102 also determines, in phase 2, the skew between the deskew signal SKWDSC[3:0] and data signals SKWDAT3[3:0], SKWDAT2[3:0], SKWDAT1[3:0], and SKWDAT0[3:0]. In particular embodiments, deskew core block 102 essentially determines FIFO pointers that may then be used to derive the output data from the FIFOs (data registers). In particular embodiments, since two deskew signal frames are matched in parallel, deskew core block 102 uses deskew bits that span a range of two frames in deskew signal SKWDSC[3:0] in order to align the data signals SKWDAT3[3:0], SKWDAT2[3:0], SKWDAT1[3:0], and SKWDAT0[3:0] to the deskew channel SKWDSC[3:0]. By way of example, this method may increase the probability that a correct match is obtained in the first try. FIG. 11 indicates the bit comparisons implemented in parallel in particular embodiments between bits in SKWDSC[3:0] and data signals SKWDAT3[3:0], SKWDAT2[3:0], SKWDAT1[3:0], and SKWDAT0[3:0] for a ±7 UI time difference (relative to the particular deskew channel bit from SKWDSC[3:0]). By way of example, in FIG. 11 bit 1102 in SKWDSC[3:0] would be compared with 15 bits 1104 in SKWDAT1[3:0]. In the figure, the deskew signal SKWDSC[3:0] is repeated for illustrative purposes. The vertical lines 1100 indicate four-bit boundaries (note that, although illustrated as serial streams, the deskew and data signals are actually 4-bit signals). Since the deskew frames have been matched, the bit position in the deskew signal SKWDSC[3:0] has been determined. Bits marked with an "X" in FIG. 11 represent even or odd parity bits that are used in deskew control block 532 to match the deskew frames and determine the bit positions within the SKWDSC[3:0] stream. Additionally, since bits from all of the data signals SKWDAT3[3:0], SKWDAT2[3:0], SKWDAT1[3:0], and SKWDAT0[3:0] are grouped into 4-bit vectors, in order to align the data signals SKWDAT3[3:0], SKWDAT2[3:0], SKWDAT1[3:0], and SKWDAT0[3:0] with the deskew signal SKWDSC[3:0], the data bits in data signals SKWDAT3[3:0], SKWDAT2[3:0], SKWDAT1[3:0], and SKWDAT0[3:0] that lead the deskew signal SKWDSC[3:0] by two clock cycles may be required to be compared as well as the data bits in data signals SKWDAT3[3:0], SKWDAT2[3:0], SKWDAT1[3:0], and SKWDAT0[3:0] that trail the deskew signal SKWDSC[3:0] by two clock cycles may be required to be compared.

Figure 12:
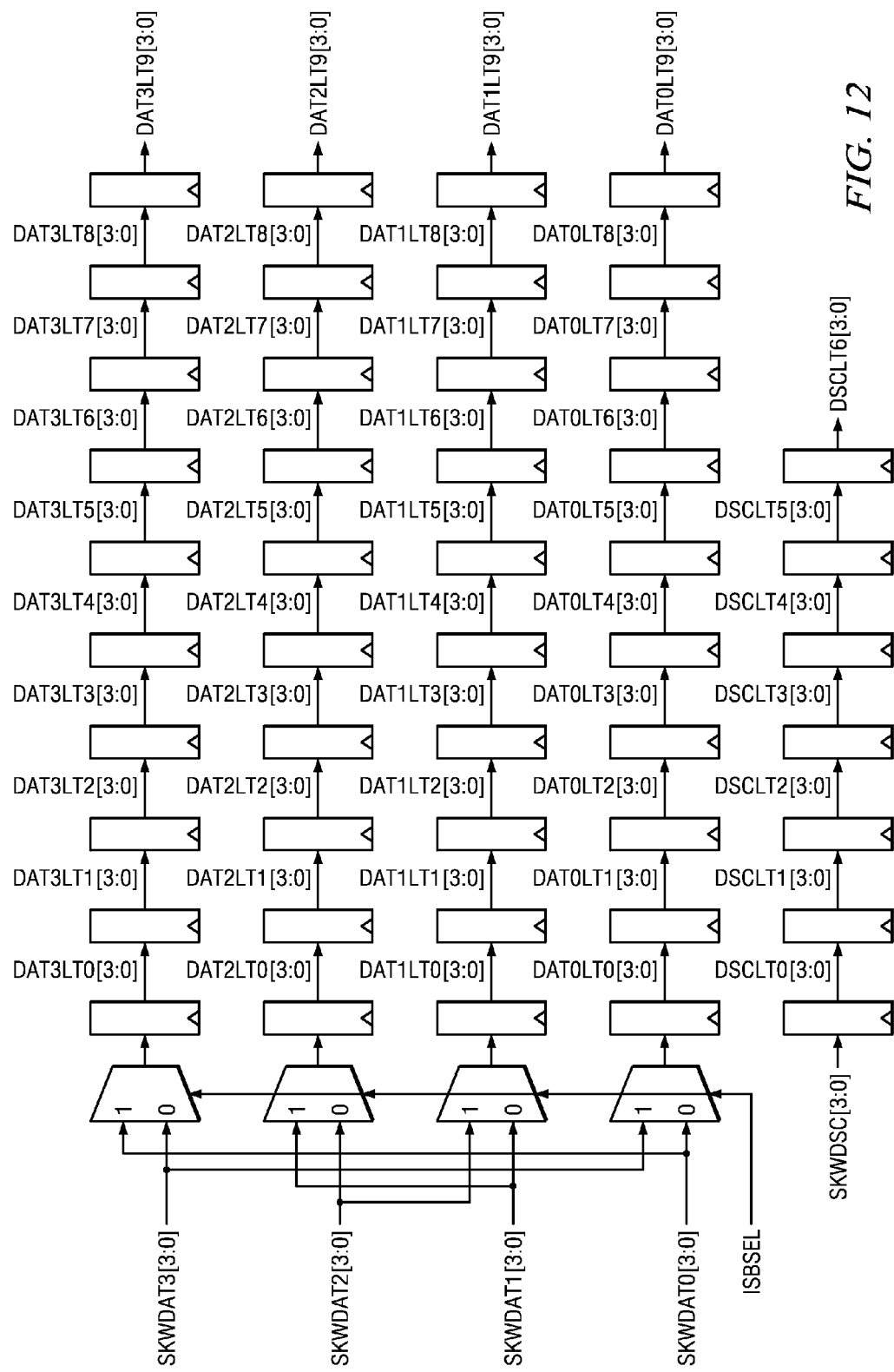
FIG. 12 illustrates an example deskew and data signal FIFO.

FIG. 12 illustrates an example deskew and data signal FIFO suitable for use in deskew control block 102. Note that a portion of the FIFO was shown in FIG. 8. As described earlier, the data signals SKWDAT3[3:0], SKWDAT2[3:0], SKWDAT1[3:0], and SKWDAT0[3:0] may be reversed/swapped (SKWDAT3[3:0] with SKWDAT0[3:0] and SKWDAT2[3:0] with SKWDAT1[3:0]) based on the value of ISBSEL. In an example embodiment, changing the bit order must occur before the data bits in data signals SKWDAT3[3:0], SKWDAT2[3:0], SKWDAT1[3:0], and SKWDAT0[3:0] are compared against the deskew channel bits in deskew signal SKWDSC[3:0] assuming that the deskew channel bits have been generated before the swap on the transmitter side as is the case in a deserializer (an example of which is described below with reference to FIGS. 18-26). Depending on timing, the data bits in data signals SKWDAT3[3:0], SKWDAT2[3:0], SKWDAT1[3:0], and SKWDAT0[3:0] and deskew signal SKWDSC[3:0] may be latched before the multiplexing occurs.

As indicated in FIGS. 11 and 12, in order to align each of the data signals SKWDAT3[3:0], SKWDAT2[3:0], SKWDAT1[3:0], and SKWDAT0[3:0] to the deskew signal SKWDSC[3:0], the logic illustrated in FIG. 12 may perform 15 four-bit equal/not-equal comparisons resulting in a total of 60 parallel four-bit comparisons for each of the four data signals SKWDAT3[3:0], SKWDAT2[3:0], SKWDAT1[3:0], and SKWDAT0[3:0].

FIGS. 13A, 13B, 13C, and 13D illustrate the bit comparisons that may be made in particular embodiments in order to align data signals SKWDAT3[3:0], SKWDAT2[3:0], SKWDAT1[3:0], and SKWDAT0[3:0] relative to deskew signal SKWDSC[3:0], respectively. In each of FIGS. 13A, 13B, 13C, and 13D, the heading row indicates the bits from the deskew signal registers of FIG. 12 that may be compared with the respective bits in the corresponding data signal SKW- DAT3[3:0], SKWDAT2[3:0], SKWDAT1[3:0], or SKWDAT0[3:0]. The remaining rows show the data bits that are compared for each case in order to determine the time difference between each of the data signals SKWDAT3[3:0], SKWDAT2[3:0], SKWDAT1[3:0], and SKWDAT0[3:0], and the deskew signal SKWDSC[3:0]. The leftmost column indicates the resulting time difference in UIs. Furthermore, the rightmost column indicates a 15-bit vector that stores the result of the respective comparisons.

Figure 14:
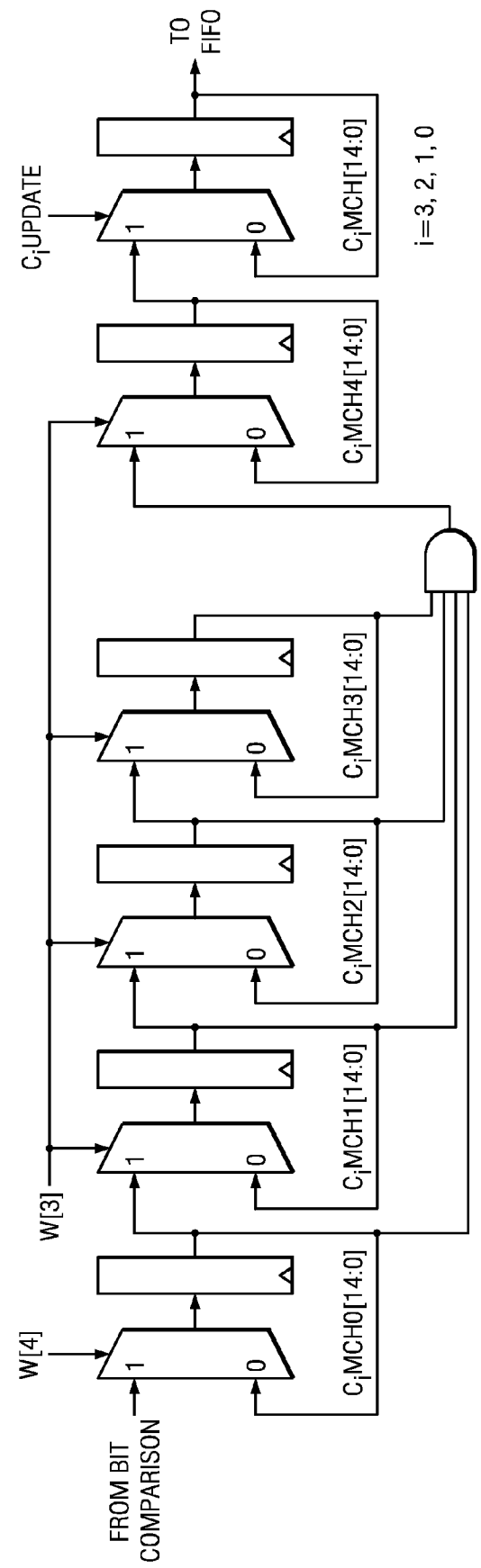
FIG. 14 illustrates an example FIFO pointer data path.

In one example embodiment, the results of the comparisons shown in FIGS. 13A, 13B, 13C, and 13D are valid only once every five cycles, as may be indicated by control signal W[4:0]. Furthermore, although the bit comparisons span two frames, it may still be generally possible to get multiple matches for each of data signals SKWDAT3[3:0], SKWDAT2[3:0], SKWDAT1[3:0], or SKWDAT0[3:0] (e.g., one bit in SKWDSC[3:0] matches more than one bit in the corresponding data signal). Hence, in particular embodiments, deskew data block 532 may further include an averaging filter to reduce the probability that multiple bits of the matching vectors are set to one. In an example embodiment, the averaging filter may be implemented in multiple parts. FIG. 14 illustrates an example FIFO pointer data path that implements part of the averaging filter. The FIFO pointers are continuously calculated in deskew core block 102 as data is received in data signals SKWDAT3[3:0], SKWDAT2[3:0], SKWDAT1[3:0], and SKWDAT0[3:0]. However, the output CiMCH[14:0] that is used to determine the FIFO pointers is not always updated. In one example embodiment, the pointer data path of FIG. 14 may perform averaging by ANDing pointer samples from four consecutive frame pairs. The results of this averaging may then be stored into CiMCH4[14:0] once every five cycles. Depending on CiUPDATE, CiMCH4[14:0] gets passed along to CiMCH[14:0]. Signal CiUPDATE may be set by a finite state machine that controls the pointer generation and determines if the data channels SKWDAT3[3:0], SKWDAT2[3:0], SKWDAT1[3:0], and SKWDAT0[3:0], and deskew channel SKWDSC[3:0] are aligned. Initially, when a match is found [((MATCHOE∥MATCHEO) && !MATCH)], CiUPDATE is set to 1, which allows CiMCH[14:0] to get updated by the corresponding incoming data signal.

In one example embodiment, as part of the digital filter, there is an eight-bit control shift/rotate register, CiOOASFT, initially set to 8'h08. The shift register operation is controlled by signal CiOOA, which indicates the data signals SKWDAT3[3:0], SKWDAT2[3:0], SKWDAT1[3:0], or SKWDAT0[3:0] and deskew signal DSC[3:0] are out of alignment. As long as CiOOA has a value of "1," CiOOASFT is shifted left until its most significant (MS) bit (CiOOASFT[7]) becomes "1." This indicates a permanent out-of-alignment and causes CiUPDATE to become "1" and CiMCH[14:0] to get updated. If CiOOA becomes "0," CiOOASFT is shifted right until its least significant (LS) bit (CiOOASFT[0]) becomes "1," which stops right shifting until CiOOA is against set to "1" and right shifting starts. The shift register provides another net of security to avoid bit errors from faulty out-of-alignment cases.

An out-of-alignment situation (either true or faulty) is detected when CiMCH4 contains multiple "1s," contains no "1s," or does not match the current FIFO point CiMCH. Typically, the former is caused by faulty out-of-alignment cases not caught by the AND-based averaging filter whereas the latter two cases are caused by true out-of-alignment cases. Regardless, all three cases may be treated in an exact or similar manner when they occur. As equation 1 below shows, CiOOA is derived by CiONE and CiMATCH. Signal CiONE indicates that CiMCH4 contains a single "1" and CiMATCH indicates that CiMCH4 and CiMCH match.

$$CiOOA = \overline{CiONE} + \overline{CiMATCH} \quad (1)$$

Figure 15:
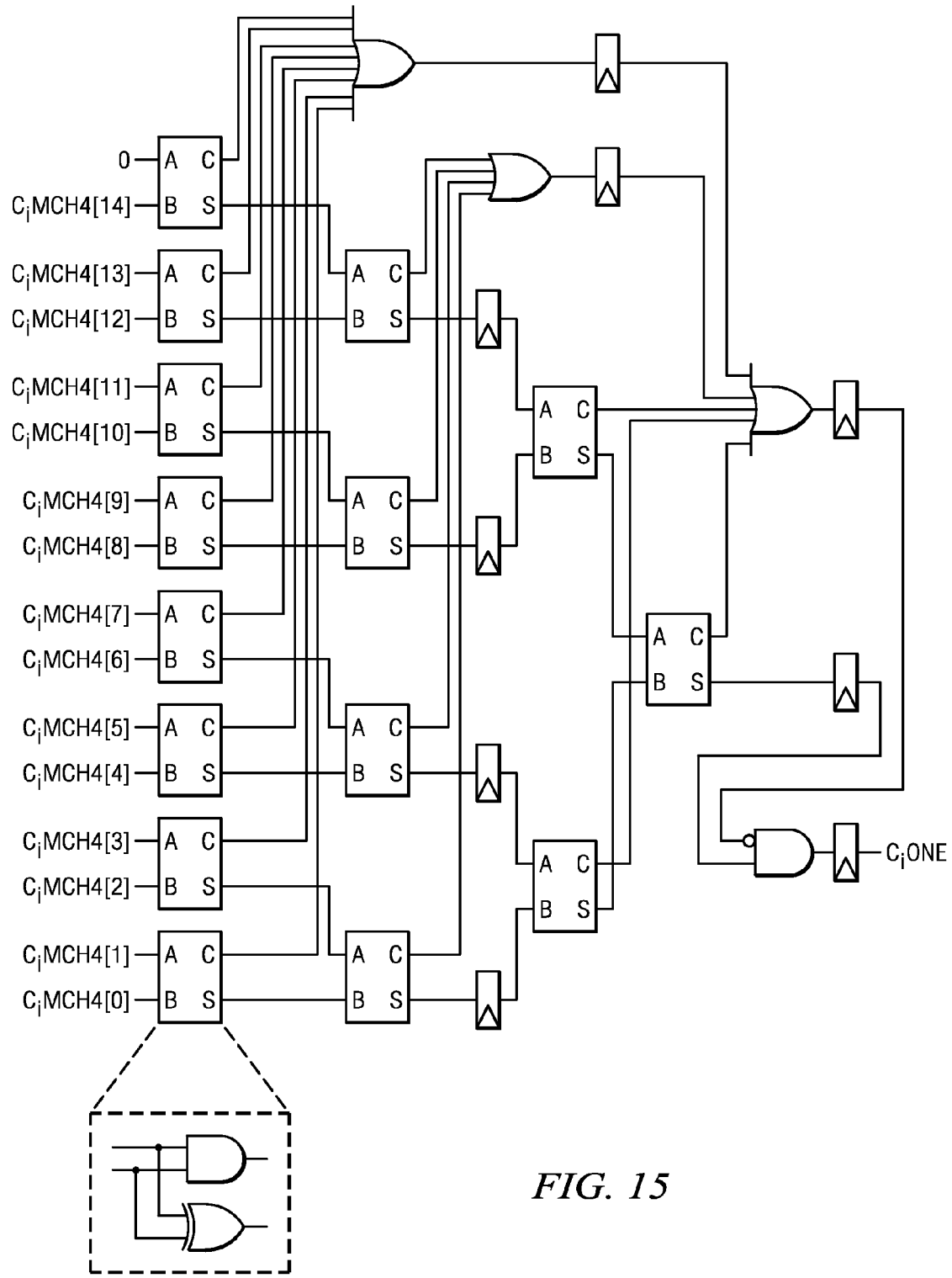
FIG. 15 illustrates an example circuit that indicates whether or not a match is true or false.

FIG. 15 illustrates an example circuit for deriving CiONE. In the illustrated embodiment, FIG. 15 is based on cascading half-adders. The output of the XOR cascade effectively indicates whether there is an odd number of "1s" (e.g., 1, 3, 5, 7, etc.). ORing the output of the half-adder carries would generate a "1" if there are multiple "1s" in the vector. Therefore, the final output would be set if there is a single "1" in the vector.

Figure 16:
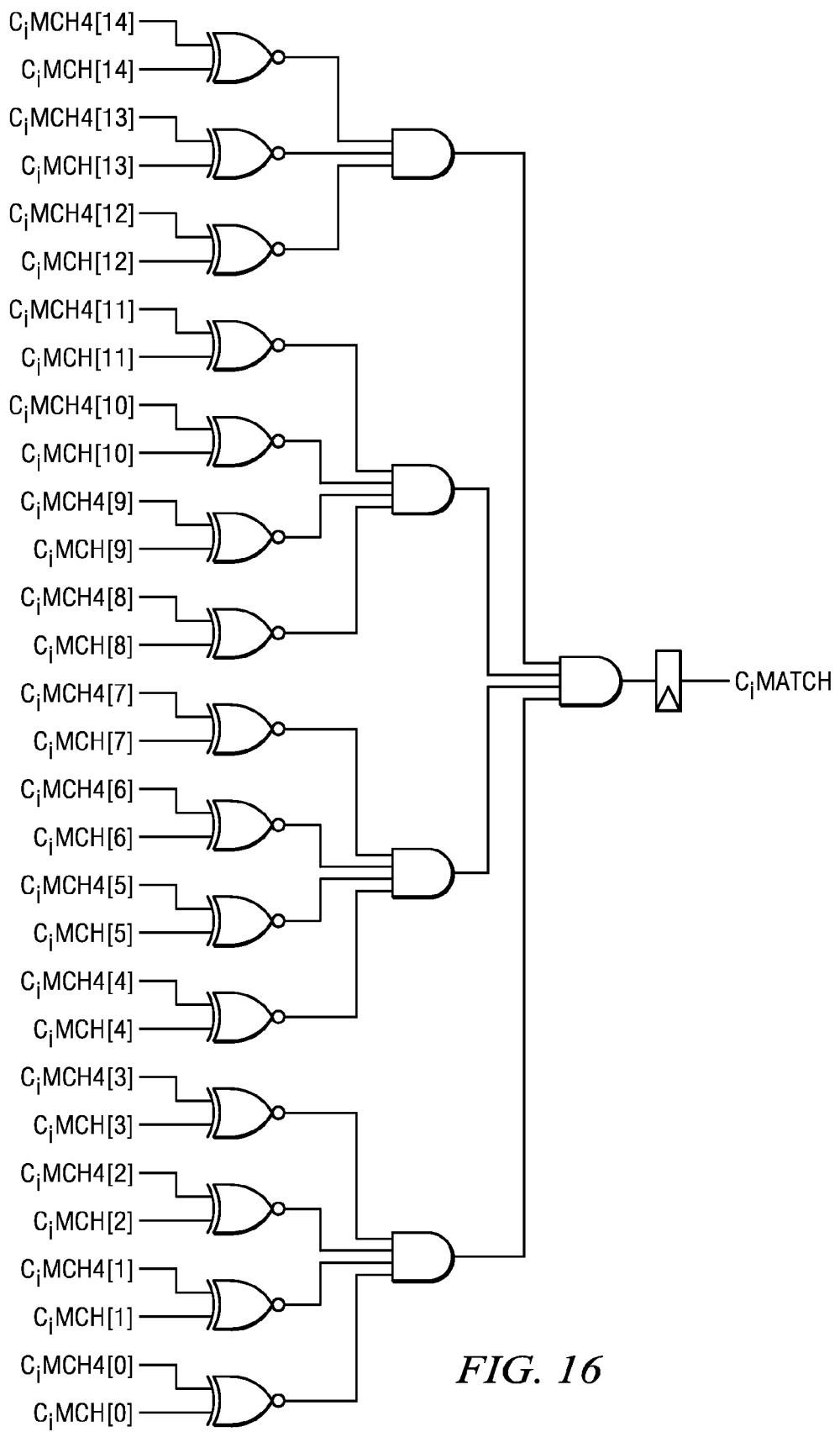
FIG. 16 illustrates an example comparison circuit for matching the two vectors
Figure 17A:
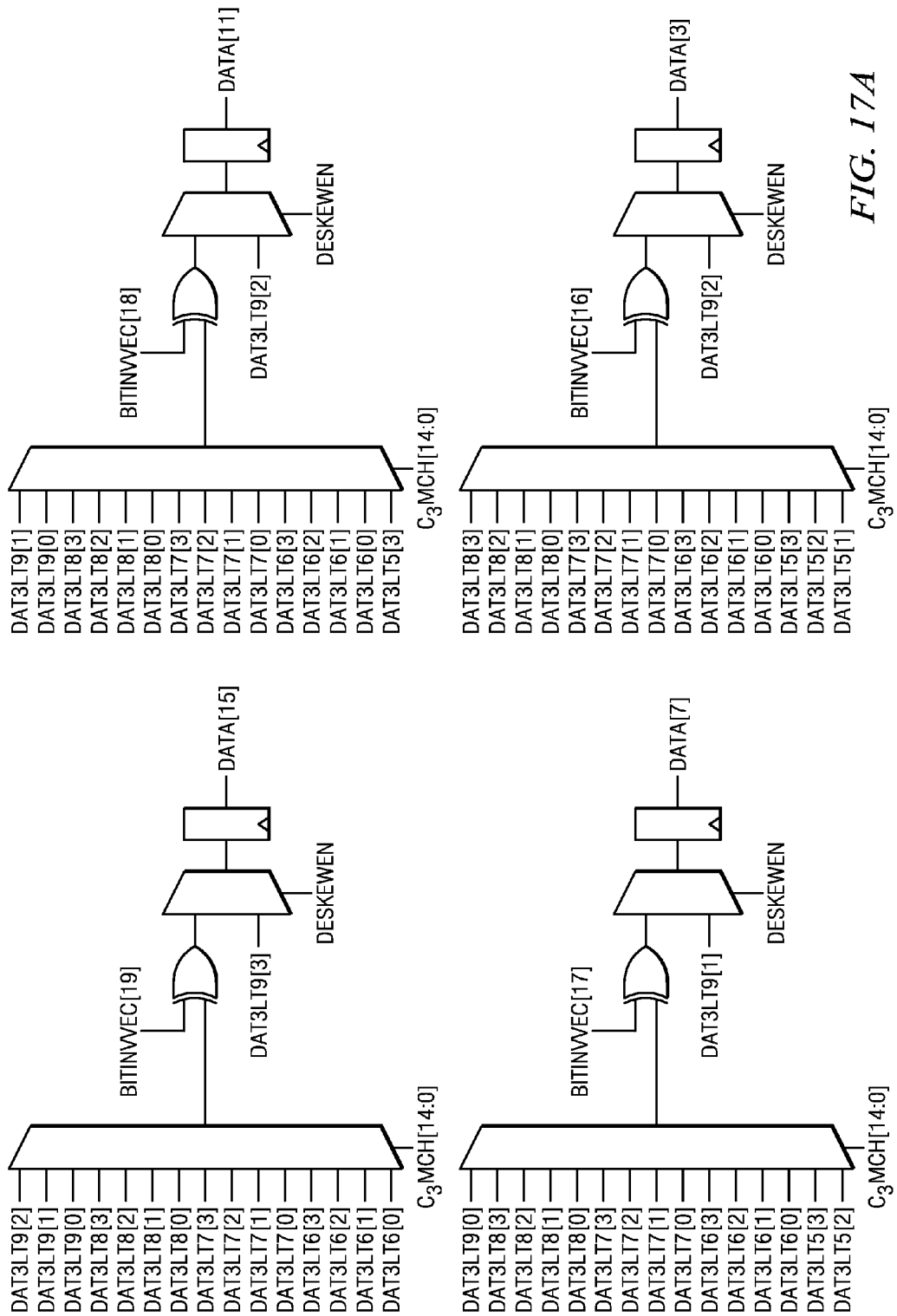
FIGS. 17A, 17B, 17C, and 17D illustrate example logic for selecting and interleaving bits from data signals.
Figure 17B:
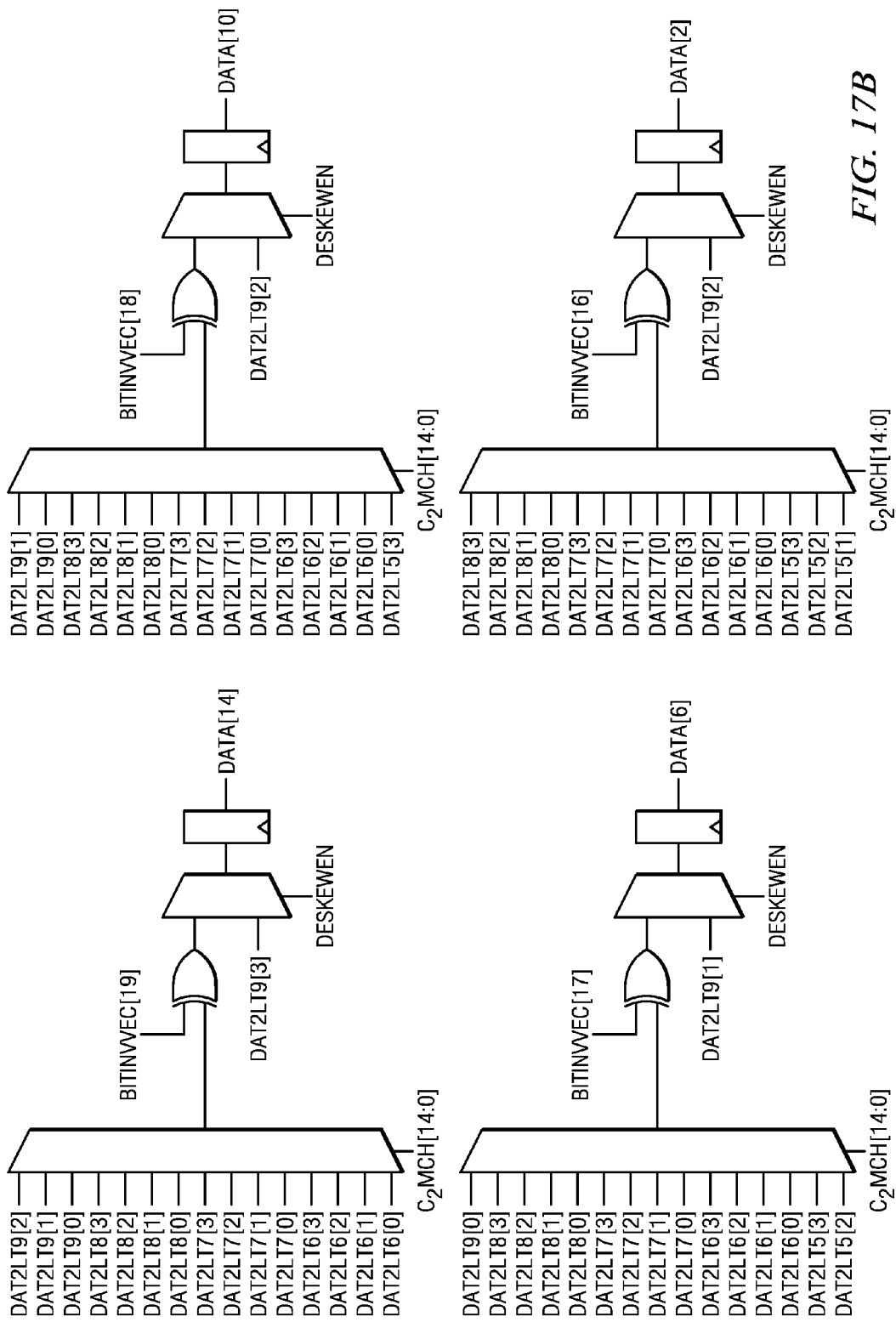
Figure 17C:
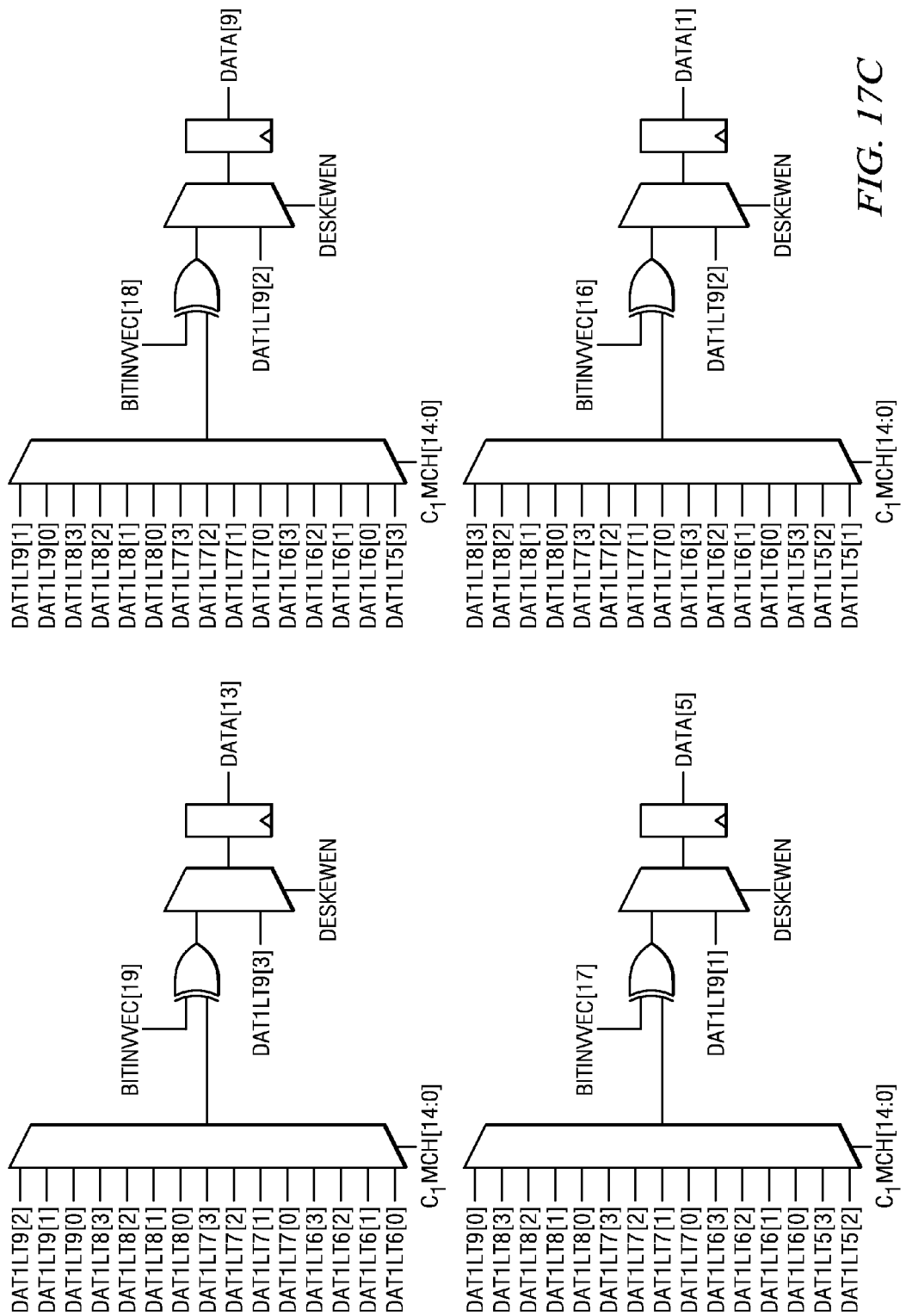
Figure 17D:
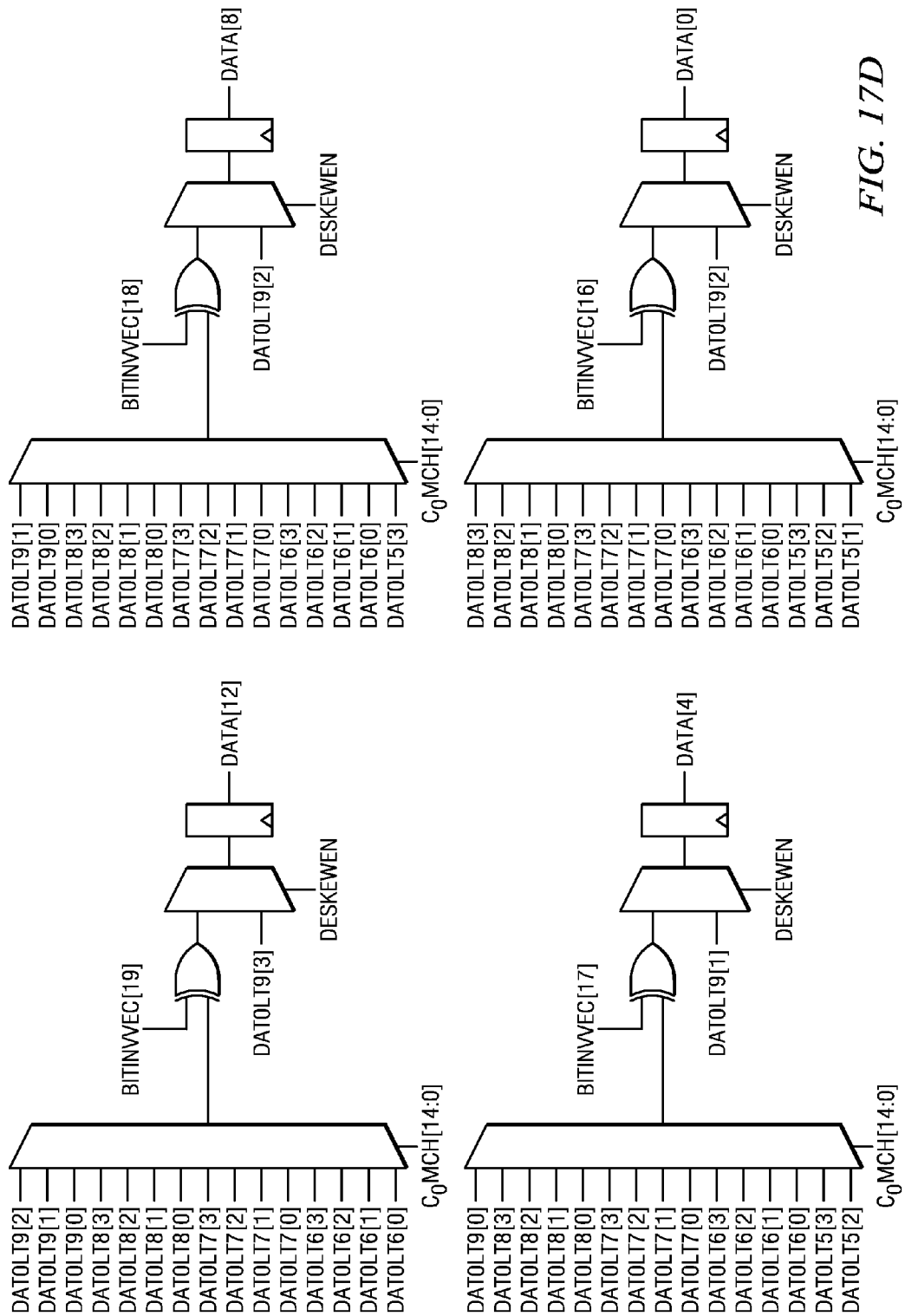

FIG. 16 illustrates an example circuit for matching the two vectors CiMCH4 and CiMCH (for i=3, 2, 1, 0). In the illustrated embodiment, the circuit of FIG. 16 is based on a standard equal/non-equal circuit. In an example embodiment, both of the circuits of FIGS. 15 and 16 are allowed five clock cycles to generate their output, namely, CiONE and CiMATCH, respectively. Although it is generally safe to have these circuits take different cycle times, it is possible to match their latency.

Equation 2, below, shows the Boolean expression that derives the loss-of-frame status signal TXLOF. The loss-of-frame status signal TXLOF is set when the deskew block 102 is in reset (either one of TXFIFORST or RST is "1") or a frame has not been matched yet (MATCH is "0").

$$TXLOF = \overline{MATCH} + TXFIFORST + RST \quad (2)$$

Equation 3, below, shows the Boolean expression that derives the out-of-alignment status signal TXOOA. The out-of-alignment status signal TXOOA is set when either one of the FIFOs is on update status.

$$TXOOA = C3UPDATE + C2UPDATE + C1UPDATE + C0UPDATE \quad (3)$$

Equation 4, below, shows how the status signal TXFIFOERR is derived from TXLOF and TXOOA.

$$TXFIFOERR = TXLOF + TXOOA \quad (4)$$

In particular embodiments, after the FIFO pointers have been set, data bits from the four data signals SKWDAT3[3:0], SKWDAT2[3:0], SKWDAT1[3:0], and SKWDAT0[3:0] are combined to generate the 16-bit output DOUT[15:0]. In particular embodiments, the bits in the four data signals SKWDAT3[3:0], SKWDAT2[3:0], SKWDAT1[3:0], and SKWDAT0[3:0] are interleaved so that data bits 15, 11, 7, and 3 of each 16 bit data word come from SKWDAT3[3:0], data bits 14, 10, 6, and 2 come from SKWDAT2[3:0], data bits 13, 9, 5, and 1 come from SKWDAT1[3:0], and data bits 12, 8, 4, and 0 come from SKWDAT0[3:0]. Additionally, if DBINV is set to 1, bits corresponding to odd nibbles may need to be inverted. Furthermore, if deskew data block 532 is disabled such as, by way of example, setting deskewEN to 0, the FIFO pointers from deskew data block 532 may be disregarded and the data may be directly passed to the output of deskew data block 532. This may be achieved by using a multiplexer controlled by deskewEN. Data bit inversion, on the other hand, may be more complicated since only data bits belonging to odd nibbles must be inverted. A 20-bit vector bitInvVec may be used to specify which bits are inverted. The four MS bits of the vector bitInvVec indicate every cycle whether or not the data coming from the data signals nned to be inverted or not. The bitInvVec vector may be set the first time a frame match occurs. If DBINV is "0," bitInvVec is set to all "0s" and there are no data bit inversions. If DBINV is "1," bitInvVec is set differently depending on whether the match is EO or OE. In setting bitInvVec, the cycles that lapse between the match and the data coming out are also considered. FIGS. 17A, 17B, 17C, and 17D illustrate example logic for selecting and interleaving bits from data signals SKWDAT3[3:0], SKWDAT2[3:0], SKWDAT1[3:0], and SKWDAT0[3:0], respectively, to form DOUT[15:0].

In particular embodiments, the data signals DAT3[3:0], DAT2[3:0], DAT1[3:0], and DAT0[3:0], and deskew signal DSC[3:0] are received over data channels TXDATA3, TXDATA2, TXDATA1, TXDATA0, and TXDSC, respectively, from a deserializer. By way of example, the data signals DAT3[3:0], DAT2[3:0], DAT1[3:0], and DAT0[3:0], and deskew signal DSC[3:0] may be the signals transmitted from deserializer data channels RXDATA3, RXDATA2, RXDATA1, RXDATA0, and RXDSC, respectively, after transmission over one or more links, as described, for example, with reference to FIGS. 18-26.

Figure 18:
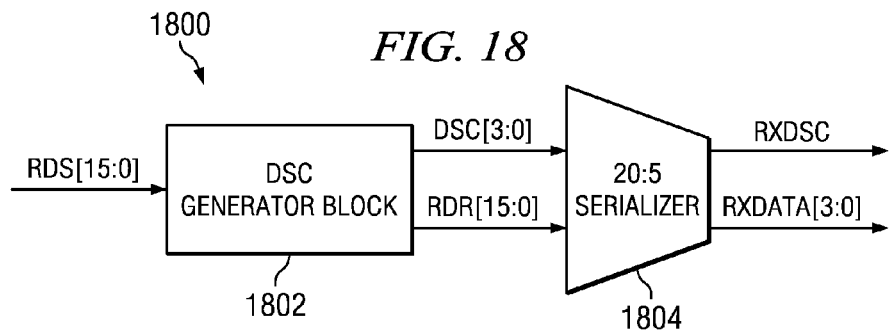
FIG. 18 illustrates an example circuit that includes a deskew channel (DSC) generator block.
Figure 19:
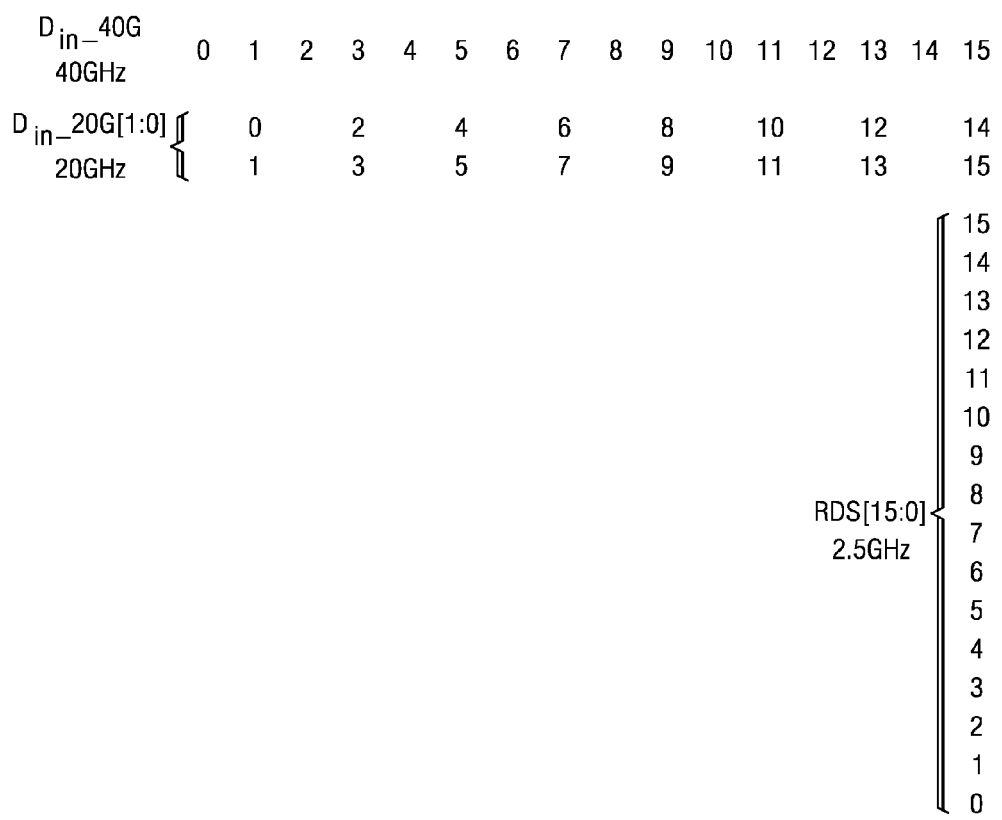
FIG. 19 illustrates an example ordering of bits input to the circuit of FIG. 1.

FIG. 18 illustrates an example circuit or system 1800 that includes a deskew channel (DSC) generator block 1802. In particular embodiments, DSC generator block 1802 receives as input a 16-bit recovered input data bit signal RDS[15:0] at 2.5 GHz (e.g., 16 parallel streams at 2.5 Gb/s each). In particular embodiments, each span of 16 bits in RDS[15:0] (per 2.5 GHz clock cycle) is referred to as a data word. By way of example, RDS[15:0] may be recovered from either one 40 Gb/s serial input data signal $D_{in\_}40G$ or a 2-bit input data signal $D_{in\_}20G$ at 20 GHz. The ordering of the bits in RDS[15:0] relative to $D_{in\_}40G$ or $D_{in\_}20G$ may be, for didactic purposes, as illustrated in FIG. 19. In the illustrated embodiment, bit 15 is the earliest in time and bit 0 is the latest in time. In particular embodiments, DSC generator block 1802 outputs the 4-bit deskew channel signal DSC[3:0] described above at 2.5 GHz as well as a 16-bit recovered data bit signal RDR[15:0] at 2.5 GHz. In particular embodiments, DSC generator block 1802 operates on all sixteen recovered streams within input data signal RDS[15:0] in parallel.

Figure 20:
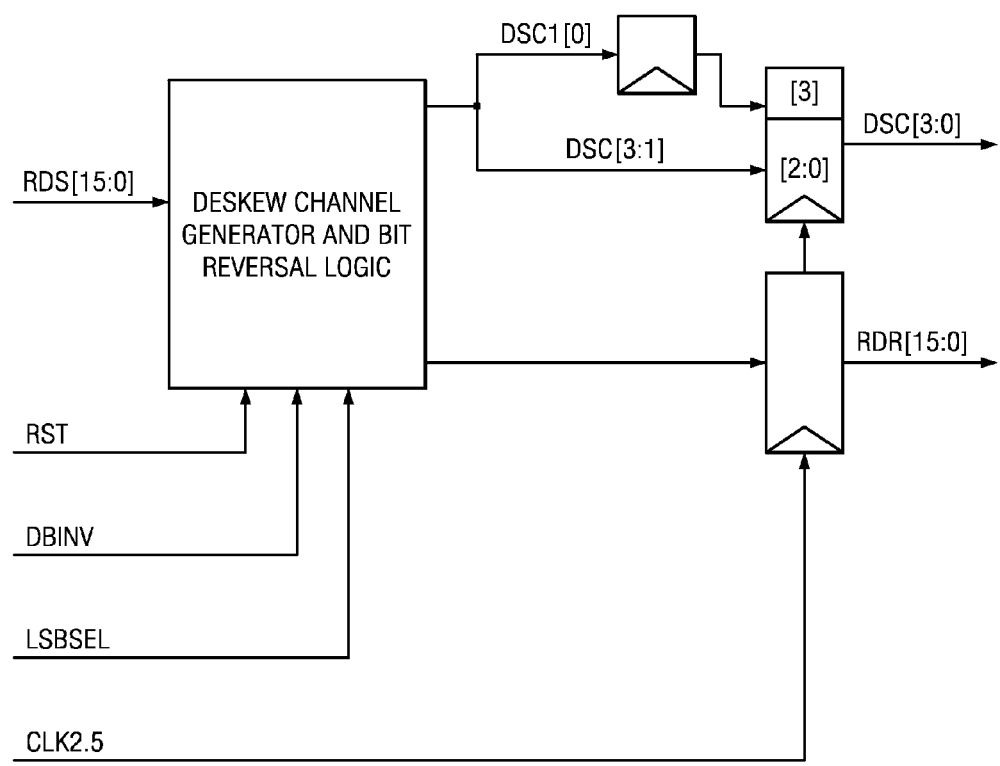
FIG. 20 illustrates an example DSC generator block.

FIG. 20 illustrates an example DSC generator block 1802. In particular embodiments, DSC generator block 1802 includes DSC generator logic and bit reversal logic. In particular embodiments, DSC generator block 1802 receives as input RDS[15:0], a 2.5 GHz clock signal CLK2.5, and control signals RST, DBINV, and LSBSEL, and outputs 4-bit deskew signal DSC[3:0]. In the illustrated embodiment, DSC generator block 1802 also outputs 16-bit data output signal RDR[15:0]. Depending on the control signal DBINV, bits in RDR[15:0] may be inverted as described in more detail below. In particular embodiments, the bits in DSC[3:0] are delayed by one unit interval (UI) at 10 Gb/s. In particular embodiments, the delay is taken into account by delaying the bits in DSC[3:0] by one bit after they have been generated.

As shown in the embodiment illustrated in FIG. 18, the signals DSC[3:0] and RDR[15:0] output from DSC generator block 1802 may then be input to a 20:5 serializer 1804. In particular embodiments, serializer 1804 serializes or multiplexes the data bits in the 16-bit data signal RDR[15:0] into the four 4-bit data signals DAT3[3:0], DAT2[3:0], DAT1[3:0], and DAT0[3:0], which are output over data channels RXDATA3, RXDATA2, RXDATA1, and RXDATA0 (collectively referred to as RXDATA[3:0]) and ultimately to data channels TXDATA3, TXDATA2, TXDATA1, and TXDATA0, described above. In particular embodiments, serializer 1804 also serializes or multiplexes DSC[3:0] into a serial signal RXDSC at 10 Gb/s, which is then ultimately transmitted over data channel TXDSC.

In particular embodiments, the bits in DSC[3:0] are organized or grouped into frames. In one particular embodiment, each frame spans ten 4-bit data transfers (e.g., ten 2.5 GHz clock cycles of data corresponding to 2.5 data words). In one embodiment, each frame is further divided into two sections referred to as nibbles. Each nibble, therefore, spans five 4-bit data transfers. As described in more detail below, each nibble is either an even or an odd nibble depending if the corresponding DSC bit is based on an even or an odd parity. When the control signal DBINV is enabled (when DBINV=1), the data in the odd nibbles is inverted. In a particular embodiment, the inversion is performed before DSC[3:0] is generated. In this manner, the inverted data is used in the calculation of the corresponding odd parity bit.

Figure 21A:
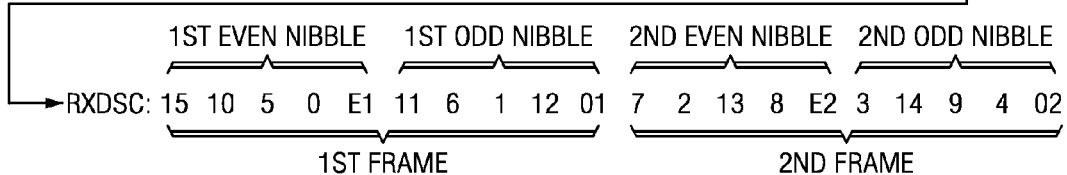
FIGS. 21A and 21B illustrate example bit relationships between a number of signals illustrated in FIG. 18.
Figure 21B:
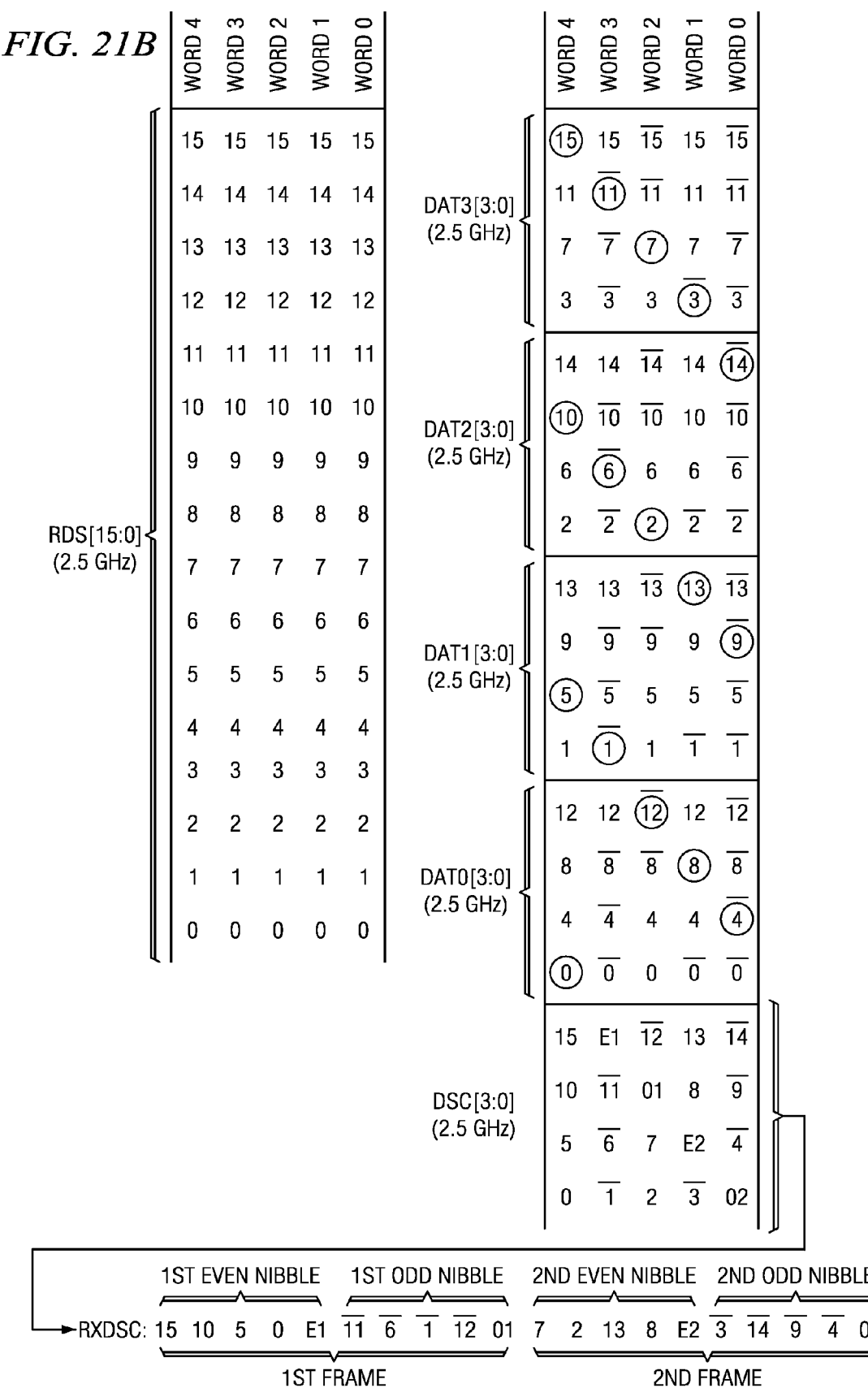

FIGS. 21A and 21B illustrate the bit relationships between RDS[15:0], DAT3[3:0], DAT2[3:0], DAT1[3:0], DAT0[3:0], DSC[3:0], and RXDSC over five words: WORD4, WORD3, WORD2, WORD1, and WORD0. In particular embodiments, since the input data RDS[15:0] is received in sixteen signals at 2.5 Gb/s each, the deskew channel signal DSC[3:0] is generated using 16-bit words at 2.5 GHz. Since each frame spans 40 bits (20 bits per nibble), the DSC generation spans multiple 16-bit words. By way of example, the minimum common multiple between 16 and 40 is 80. Therefore, the DSC generation spans y 16-bit words, where y=80÷16=5, and produces two frames (per DSC generation cycle).

In particular, FIG. 21A illustrates how the 16-bit words are multiplexed by serializer 1804 into the four 4-bit data signals DAT3[3:0], DAT2[3:0], DAT1[3:0], and DAT0[3:0] when DBINV is not enabled (e.g., when DBINV=0) while FIG. 21B illustrates how the 16-bit words are multiplexed into the four 4-bit data signals DAT3[3:0], DAT2[3:0], DAT1[3:0], and DAT0[3:0] when DBINV is enabled (e.g., when DBINV=1). In FIG. 21B, the inverted bits are illustrated with an overline. As described above, each of FIGS. 21A and 21B span five 16-bit words from RDS[15:0]. In the illustrated embodiment, by convention, WORD4 and bit 15 are the earliest in time.

FIG. 21A also illustrates how bits in the five 16-bit input data words are selected for generating the deskew channel signal DSC[3:0] when DBINV is not enabled, while FIG. 21B illustrates how bits in the five 16-bit input data words are selected for generating the deskew channel signal DSC[3:0] when DBINV is enabled. The bits used to generate DSC[3:0] are circled in the corresponding data signals DAT3[3:0], DAT2[3:0], DAT1[3:0], and DAT0[3:0]. In FIG. 21B, the inverted bits are illustrated with an overline. In particular embodiments, the bits in DSC[3:0] are generated in groups of four at 2.5 GHz to match the rate of the data bits. As described above, the sequences in FIGS. 21A—and 21B are repeated every five words.

Figure 22:
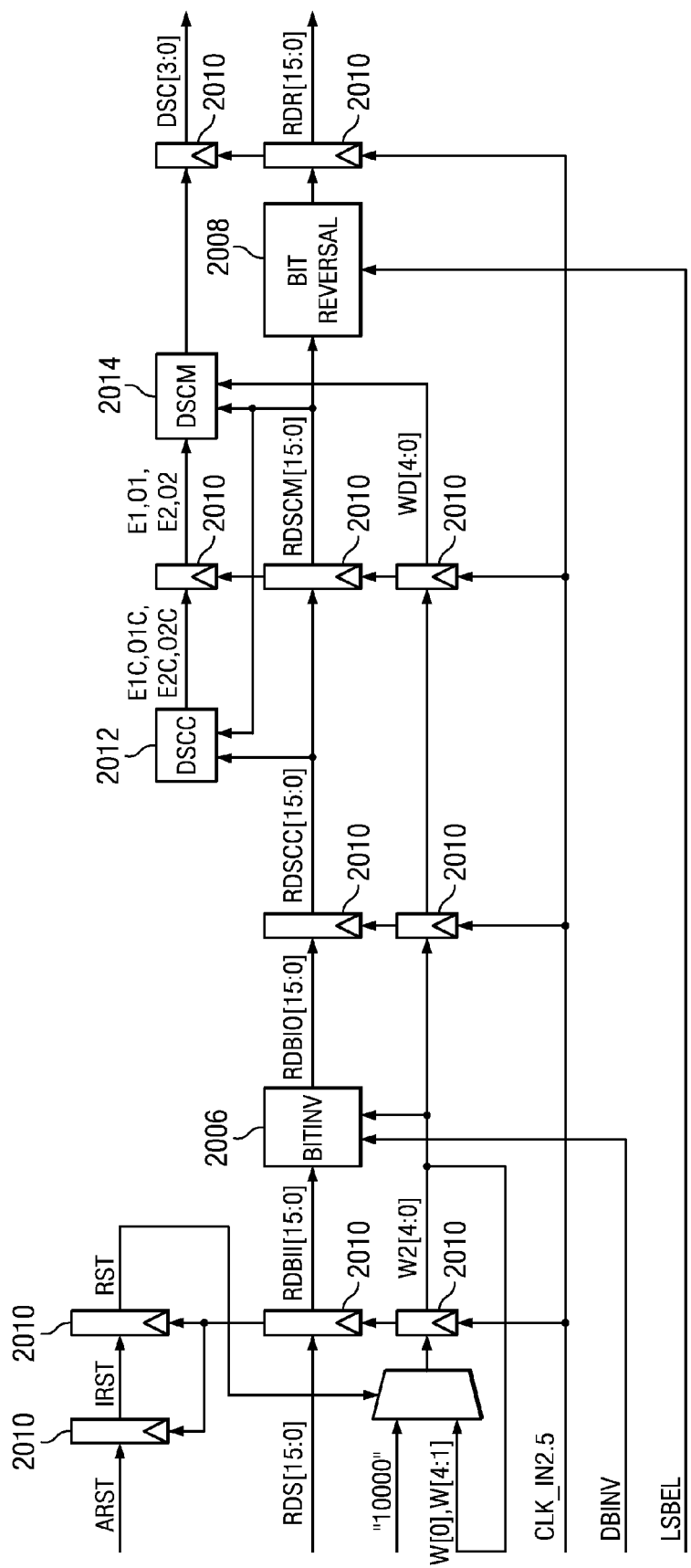
FIG. 22 illustrates a block diagram of example DSC generation and bit reversal logic.

FIG. 22 illustrates a block diagram of example DSC generation and bit reversal logic suitable for use in an example embodiment of the DSC generator block 1802 of FIG. 20. In the illustrated embodiment, DSC generator block 1802 includes a bit inversion (bitInv) block 2006, a bit reversal block 2008, and a number of clock elements 2010 that, in the illustrated embodiment, are implemented as flip-flops. For didactic purposes, the logic may be essentially divided into three stages. By way of example, the first stage may perform the bit inversion while the last two perform the deskew channel generation. The last stage may also be used to delay DSC[3:0] by one 10 Gb/s UI (e.g., one bit) relative to the data. In particular, since the four bits of DSC[3:0] each clock cycle are generated in parallel synchronous to the 16-bit data, bit 0 is delayed by one cycle and becomes DSC[3] while bits [3:1] become DSC[2:0]. However, it should be appreciated that, depending on the complexity of each stage as well as the process performance, the number of stages may be reduced.

In one embodiment, the operation of DSC generator block 1802 is controlled by a five-bit register W2[4:0] that indicates which data word is being processed. During reset (RST=1), W2[4:0] may be initialized to "10000." Subsequently, W2[4:0] may be rotated right in each cycle as shown in FIG. 22. The control register W2[4:0] may be passed with the data along the logic. In a particular embodiment, the DSC generation logic must be split into at least two stages since bits from two consecutive data words may be required to calculate the even and odd parity bits E1, O1, E2, and O2.

Figure 23:
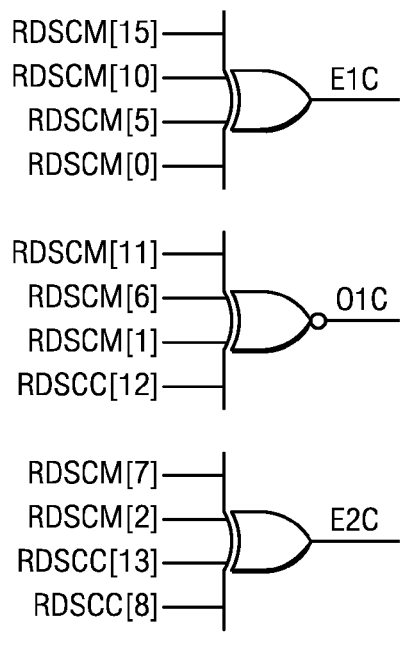
FIG. 23 illustrates example logic in a DSCC block.
Figure 25:
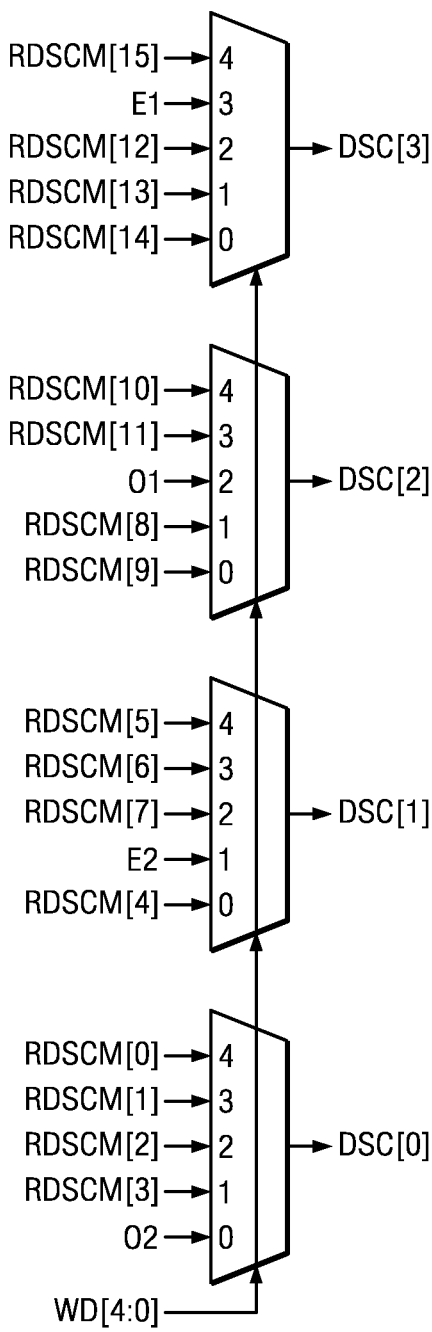
FIG. 25 illustrates example logic in a DSCM block.

FIG. 23 illustrates example logic in DSCC block 2012. DSCC block 2012 calculates and generates the even and odd parity bits E1, O1, E2, and O2 described above based on two consecutive words (RDSCM and RDSCC). FIG. 25 illustrates example logic in DSCM block 2014. DSCM block 2014 generates DSC[3:0] based on RDSCM[15:0] and the even and odd parity bits E1, O1, E2, and O2 as illustrated in FIGS. 21A and 21B.

Figure 24:
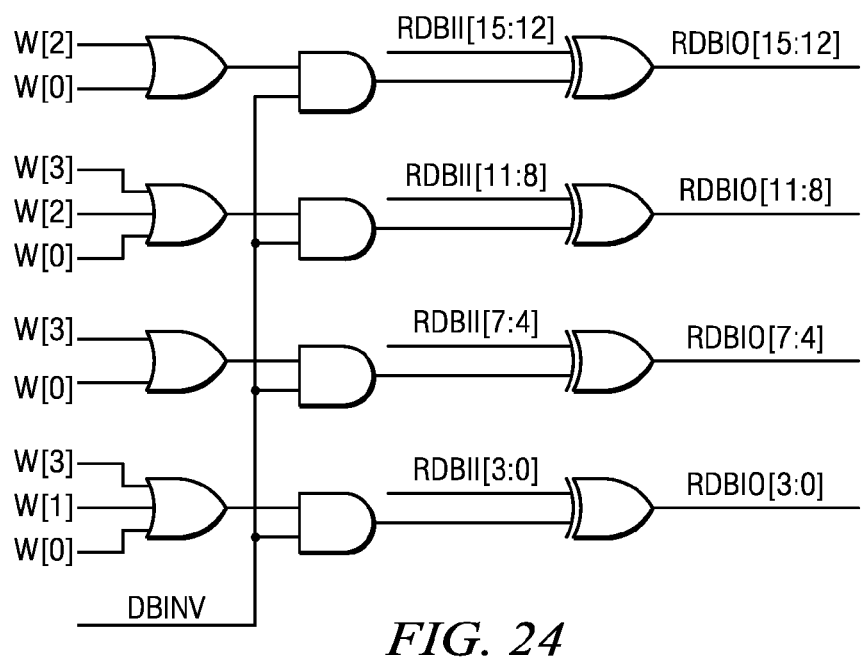
FIG. 24 illustrates example logic in a bitInv block.

In particular embodiments, DSC generator block 1802 supports a selectable feature to overcome the problem of long consecutive identical digits (CID) that may occur for certain applications when distributed over four lines. In such particular embodiments, the bits of the five data nibbles used for the odd parity are inverted for all four data lines, as described in more detail above. In such cases, the inverted bits are included in the deskew signal DSC[3:0] and are used to generate the odd parity bits. FIG. 24 illustrates example logic in bitInv block 506.

Figure 26:
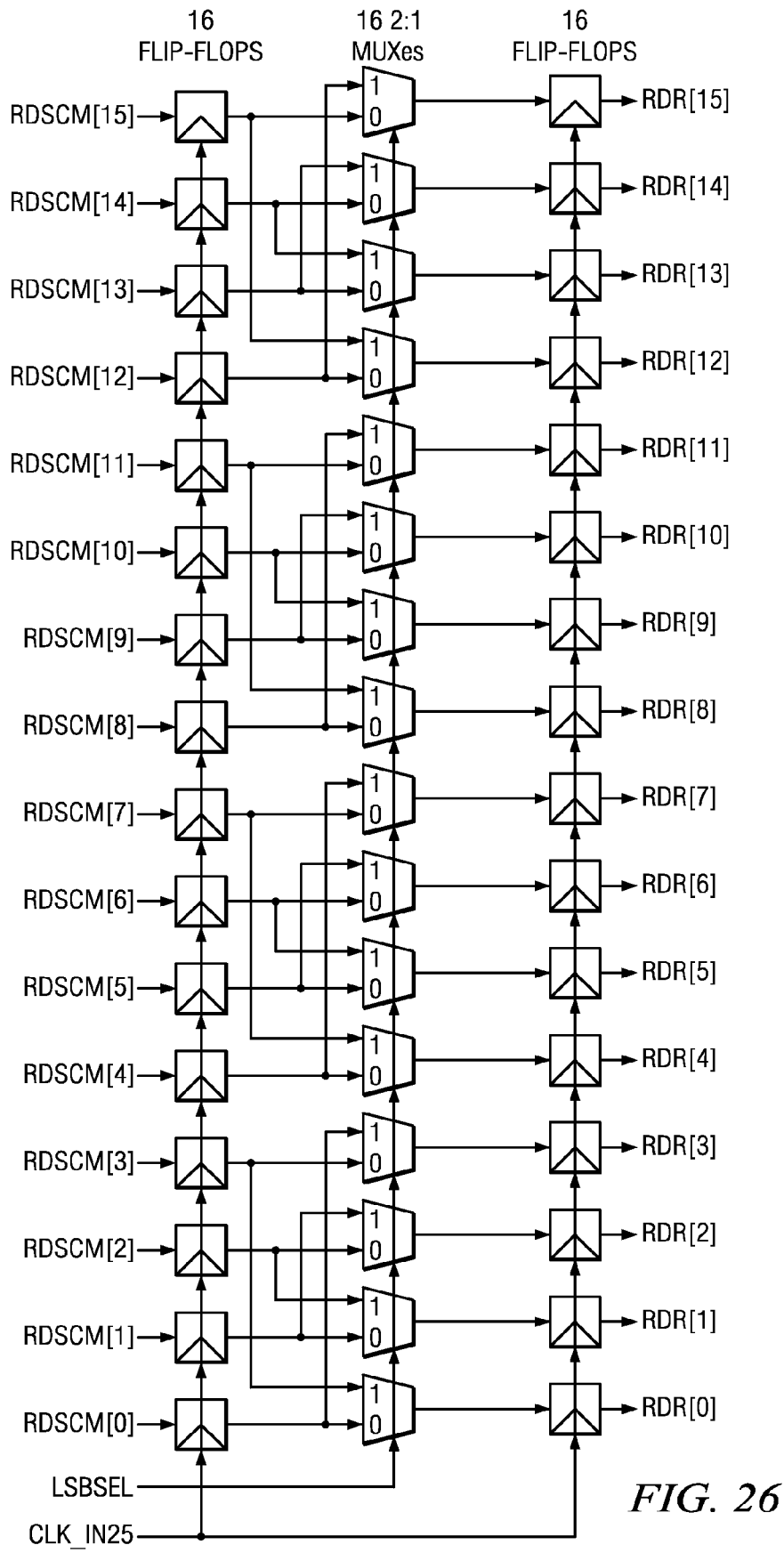
FIG. 26 illustrates example logic in a bit reversal block.

The bit reversal block 2008 reverses the bits within the four-bit fields in RDS[15:0], when configuration register (external control) bit LSBSEL=1. The LSBSEL signal, when enabled (e.g., LSBSEL=1), causes the MSB and LSB in DATA[3:0] to be reversed after these bits are used to generate DSC[3:0]. By way of example, RDS[15:12] would convert to RDR[12:15], RDS[11:8] would convert to RDR[8:11], and so on. Generally, when LSBSEL=1, RXDATA[3:0] becomes RXDATA[0:3] (the data signals are swapped). FIG. 26 illustrates example logic in bit reversal block 2008.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
   receiving input data bits over n parallel input data streams in each of m parallel data channels, each of the input data streams having a data stream rate, the input data bits in each of the data channels being collectively received at a data channel rate such that n input data bits are received in each of the data channels every data-channel clock period and such that n×m input data bits are collectively received in all of the data channels every data-channel clock period, n×m of the input data bits constituting an input data word;
   receiving deskew channel bits over n parallel deskew streams, each of the deskew channel bits being one of the input data bits or a framing bit, the deskew channel bits constituting frames that each comprise x of the input data bits;
   determining frame boundaries of the frames by identifying the framing bits among the deskew channel bits;
   mapping each of the input data bits in each of the frames to one of the m parallel data channels based on the determined frame boundaries to identify which ones of the input data words correspond to which ones of the frames, the mapping comprising, for each set of one or more of the frames, matching k deskew channel bits in the set of the frames in parallel with a predetermined deskew-channel-bit pattern, the matching comprising matching ones of the framing bits in the k deskew channel bits with framing bits in the predetermined deskew-channel-bit pattern;
   for each set of the frames, comparing, in parallel, the input data bits in the set of the frames with the input data bits in the one or more input data words that correspond to the set of the frames, the comparing comprising matching the input data bits among the k deskew channel bits in parallel with the corresponding input data bits in the data channels, each of the input data bits among the k deskew channel bits being matched with l input data bits in a particular one of the data channels, the l input data bits corresponding to a first set of input data bits received over l respective data-channel clock periods, each of the input data bits in each of the data channels being matched with m deskew channel bits in parallel;
   determining one or more delays among the m parallel data channels and the deskew channel relative to each other based on the comparison;
   when one or more non-zero delays are determined, rearranging one or more of the input data bits in one or more of the input data words to reduce one or more of the delays;
   when it is determined that one or more of the data channels have a delay of greater than l data-channel clock periods relative to a particular one of the data channels after a threshold number of data-channel clock periods has elapsed, delaying input data bits in the particular one of the data channels by an additional +/−l input data bits to extend the effective range of the parallel matching of the input data bits among the k deskew channel bits with the corresponding input data bits in the data channels beyond l input data bits.

2. The method of claim 1, wherein each determined delay is determined as an integer multiple of a data channel clock period.

3. The method of claim 2, wherein rearranging comprises rearranging the input data bits to eliminate delays from −7 to +7 UI, where 1 UI is a unit time interval equivalent to one data channel clock period.

4. The method of claim 3, wherein each of the framing bits is an even parity bit or an odd parity bit.

5. The method of claim 4, wherein:
   each of the frames comprises x input data bits and two framing bits, x being equal to (n×m)/2; and
   each of the frames comprises an even nibble and an odd nibble, each of the nibbles comprising x/2 input data bits from one or two of the input data words followed by an even parity bit or an odd parity bit from the framing bits, the nibbles in each of the frames having alternating parities.

6. The method of claim 5, wherein:
   k is equal to (i×x)+f,
   i is the number of consecutive frames whose respective deskew channel bits are being matched in parallel with the predetermined deskew-channel-bit pattern and with the corresponding input data bits in the data channels; and
   f is the number of framing bits in i consecutive frames and being equal to 2×i; and
   l is 15.

7. The method of claim 6, wherein n is 4, m is 4, and i is 2.

8. The method of claim 7, wherein determining frame boundaries of the frames by identifying the framing bits among the deskew channel bits and mapping each of the input data bits in each of the frames to one of the m parallel data channels based on the determined frame boundaries to identify which ones of the input data words correspond to which ones of the frames comprises matching 20 deskew channel bits in parallel with a predetermined deskew-channel-bit pattern, the matching comprising matching even and odd parity bits in the 20 deskew channel bits with even and odd parity bits in the predetermined deskew-channel-bit pattern, the deskew channel bits comprising n×m input data bits from two consecutive frames, two even parity bits from the framing bits, and two odd parity bits from the framing bits.

9. The method of claim 8, wherein comparing, in parallel, the input data bits in the frame with the input data bits in the one or more input data words that correspond to the frame comprises matching the input data bits among the 20 deskew channel bits in parallel with the input data bits in the data channels, each of the input data bits among the 20 deskew channel bits being matched with 15 input data bits in a particular one of the data channels, the input data bits in each of the data channels being matched with 4 deskew channel bits in parallel.

10. The method of claim 9, wherein matching each input data bit among the 20 deskew channel bits with 15 input data bits in a particular one of the data channels comprises matching the input data bit among the 20 deskew channel bits with:
the seven input data bits in the particular one of the data channels at the respective seven data-channel clock cycles immediately preceding the input data bit among the 20 deskew channel bits;
the seven input data bits in the particular one of the data channels at the respective seven data-channel clock cycles immediately following the input data bit among the 20 deskew channel bits; and
the input data bit in the particular one of the data channels at the data-channel clock cycle corresponding to the input data bit among the 20 deskew channel bits.

11. The method of claim 1, wherein:
the input data bits from all of the n parallel input data streams in all of the m parallel data channels are collectively received at a collective data rate; and
each consecutive pair of frames comprises n×m input data bits from y input data words, y being equal to z/(n×m), z being a first common multiple of the collective data rate and the product n×m.

12. The method of claim 11, wherein the collective data rate is approximately 40 Gb/s.

13. The method of claim 1, wherein the method is performed in an entirely digital complementary metal-oxide-semiconductor (CMOS) circuit.

14. A circuit comprising:
a deskew block configured to:
receive input data bits over n parallel input data streams in each of m parallel data channels, each of the input data streams having a data stream rate, the input data bits in each of the data channels being collectively received at a data channel rate such that n input data bits are received in each of the data channels every data-channel clock period and such that n×m input data bits are collectively received in all of the data channels every data-channel clock period, n×m of the input data bits constituting an input data word;
receive deskew channel bits over n parallel deskew streams, each of the deskew channel bits being one of the input data bits or a framing bit, the deskew channel bits constituting frames that each comprise x of the input data bits;
determine frame boundaries of the frames by identifying the framing bits among the deskew channel bits;
map each of the input data bits in each of the frames to one of the m parallel data channels based on the determined frame boundaries to identify which ones of the input data words correspond to which ones of the frames, wherein to map each of the input data bits the deskew block is configured to, for each set of one or more of the frames, match k deskew channel bits in the set of the frames in parallel with a predetermined deskew-channel-bit pattern, wherein to match the deskew channel bits, the deskew block is configured to match ones of the framing bits in the k deskew channel bits with framing bits in the predetermined deskew-channel-bit pattern;
for each set of the frames, compare, in parallel, the input data bits in the set of the frames with the input data bits in the one or more input data words that correspond to the set of the frames, wherein to compare the input data bits, the deskew block is configured to match the input data bits among the k deskew channel bits in parallel with the corresponding input data bits in the data channels, each of the input data bits among the k deskew channel bits being matched with l input data bits in a particular one of the data channels, the l input data bits corresponding to a first set of input data bits received over l respective data-channel clock periods, each of the input data bits in each of the data channels being matched with m deskew channel bits in parallel;
determine one or more delays among the m parallel data channels and the deskew channel relative to each other based on the comparison; and
when one or more non-zero delays are determined, rearrange one or more of the input data bits in one or more of the input data words to reduce one or more of the delays; and
a control block configured to, when it is determined that one or more of the data channels have a delay of greater than l data-channel clock periods relative to a particular one of the data channels after a threshold number of data-channel clock periods has elapsed, delay input data bits in the particular one of the data channels by an additional +/−1 input data bits to extend the effective range of the parallel matching of the input data bits among the k deskew channel bits with the corresponding input data bits in the data channels beyond l input data bits.

15. The circuit of claim 14, wherein each determined delay is determined as an integer multiple of a data channel clock period.

16. The circuit of claim 15, wherein to rearrange the input data bits, the deskew block is configured to rearrange the input data bits to eliminate delays from −7 to +7 UI, where 1 UI is a unit time interval equivalent to one data channel clock period.

17. The circuit of claim 16, wherein each of the framing bits is an even parity bit or an odd parity bit.

18. The circuit of claim 17, wherein:
each of the frames comprises x input data bits and two framing bits, x being equal to (n×m)/2; and
each of the frames comprises an even nibble and an odd nibble, each of the nibbles comprising x/2 input data bits from one or two of the input data words followed by an even parity bit or an odd parity bit from the framing bits, the nibbles in each of the frames having alternating parities.

19. The circuit of claim 18, wherein:
k is equal to (i×x)+f,
i is the number of consecutive frames whose respective deskew channel bits are being matched in parallel with the predetermined deskew-channel-bit pattern and with the corresponding input data bits in the data channels; and
f is the number of framing bits in i consecutive frames and being equal to 2×i; and
l is 15.

20. The circuit of claim 19, wherein n is 4, m is 4, and i is 2.

21. The circuit of claim 20, wherein to determine frame boundaries of the frames by identifying the framing bits among the deskew channel bits and to map each of the input data bits in each of the frames to one of the m parallel data channels based on the determined frame boundaries to identify which ones of the input data words correspond to which ones of the frames, the deskew block is configured to match 20 deskew channel bits in parallel with a predetermined deskew-channel-bit pattern, wherein to match the 20 deskew channel bits the deskew block is configured to match even and odd parity bits in the 20 deskew channel bits with even and odd parity bits in the predetermined deskew-channel-bit pattern, the 20 deskew channel bits comprising n×m input data bits from two consecutive frames, two even parity bits from the framing bits, and two odd parity bits from the framing bits.

22. The circuit of claim 21, wherein to compare, in parallel, the input data bits in the frame with the input data bits in the one or more input data words that correspond to the frame, the deskew block is configured to match the input data bits among the 20 deskew channel bits in parallel with the input data bits in the data channels, each of the input data bits among the 20 deskew channel bits being matched with 15 input data bits in a particular one of the data channels, the input data bits in each of the data channels being matched with 4 deskew channel bits in parallel.

23. The circuit of claim 22, wherein to match each input data bit among the 20 deskew channel bits with 15 input data bits in a particular one of the data channels, the deskew block is configured to match the input data bit among the 20 deskew channel bits with:
the seven input data bits in the particular one of the data channels at the respective seven data-channel clock cycles immediately preceding the input data bit among the 20 deskew channel bits;
the seven input data bits in the particular one of the data channels at the respective seven data-channel clock cycles immediately following the input data bit among the 20 deskew channel bits; and
the input data bit in the particular one of the data channels at the data-channel clock cycle corresponding to the input data bit among the 20 deskew channel bits.

24. The circuit of claim 14, wherein:
the input data bits from all of the n parallel input data streams in all of the m parallel data channels are collectively received at a collective data rate; and
each consecutive pair of frames comprises n×m input data bits from y input data words, y being equal to z/(n×m), z being a first common multiple of the collective data rate and the product n×m.

25. The circuit of claim 24, wherein the collective data rate is approximately 40 Gb/s.

26. The circuit of claim 14, wherein the circuit is an entirely digital complementary metal-oxide-semiconductor (CMOS) circuit.

27. A system comprising:
means for receiving input data bits over n parallel input data streams in each of m parallel data channels, each of the input data streams having a data stream rate, the input data bits in each of the data channels being collectively received at a data channel rate such that n input data bits are received in each of the data channels every data-channel clock period and such that n×m input data bits are collectively received in all of the data channels every data-channel clock period, n×m of the input data bits constituting an input data word;
means for receiving deskew channel bits over n parallel deskew streams, each of the deskew channel bits being one of the input data bits or a framing bit, the deskew channel bits constituting frames that each comprise x of the input data bits;
means for determining frame boundaries of the frames by identifying the framing bits among the deskew channel bits;
means for mapping each of the input data bits in each of the frames to one of the m parallel data channels based on the determined frame boundaries to identify which ones of the input data words correspond to which ones of the frames, the means for mapping comprising, for each set of one or more of the frames, means for matching k deskew channel bits in the set of the frames in parallel with a predetermined deskew-channel-bit pattern, the means for matching comprising means for matching ones of the framing bits in the k deskew channel bits with framing bits in the predetermined deskew-channel-bit pattern;
means for, for each set of the frames, comparing, in parallel, the input data bits in the set of the frames with the input data bits in the one or more input data words that correspond to the set of the frames, the comparing comprising matching the input data bits among the k deskew channel bits in parallel with the corresponding input data bits in the data channels, each of the input data bits among the k deskew channel bits being matched with l input data bits in a particular one of the data channels, the l input data bits corresponding to a first set of input data bits received over l respective data-channel clock periods, each of the input data bits in each of the data channels being matched with m deskew channel bits in parallel;
means for determining one or more delays among the m parallel data channels and the deskew channel relative to each other based on the comparison;
means for, when one or more non-zero delays are determined, rearranging one or more of the input data bits in one or more of the input data words to reduce one or more of the delays;
means for, when it is determined that one or more of the data channels have a delay of greater than l data-channel clock periods relative to a particular one of the data channels after a threshold number of data-channel clock periods has elapsed, delaying input data bits in the particular one of the data channels by an additional +/−l input data bits to extend the effective range of the parallel matching of the input data bits among the k deskew channel bits with the corresponding input data bits in the data channels beyond l input data bits.

* * * * *

UNITED STATES PATENT AND TRADEMARK OFFICE
CERTIFICATE OF CORRECTION

| | |
|---|---|
| PATENT NO. | : 8,432,995 B2 |
| APPLICATION NO. | : 12/840985 |
| DATED | : April 30, 2013 |
| INVENTOR(S) | : Samir Parikh et al. |

Page 1 of 1

It is certified that error appears in the above-identified patent and that said Letters Patent is hereby corrected as shown below:

In the Claims:

Col. 13, Ln. 12: Before "deskew channel bits" insert --20--.

Signed and Sealed this
Twenty-first Day of October, 2014

Michelle K. Lee
*Deputy Director of the United States Patent and Trademark Office*